(12) United States Patent
Rousseau et al.

(10) Patent No.: US 12,539,815 B2
(45) Date of Patent: Feb. 3, 2026

(54) STORAGE BOX ASSEMBLY FOR A VEHICLE

(71) Applicant: BOMBARDIER RECREATIONAL PRODUCTS INC., Valcourt (CA)

(72) Inventors: Philippe Rousseau, Sherbrooke (CA); Nizar Sebri, Levis (CA); Mathieu Rochon, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 561 days.

(21) Appl. No.: 18/163,731

(22) Filed: Feb. 2, 2023

(65) Prior Publication Data

US 2023/0242041 A1 Aug. 3, 2023

Related U.S. Application Data

(60) Provisional application No. 63/306,172, filed on Feb. 3, 2022.

(51) Int. Cl.
*B60R 5/00* (2006.01)
(52) U.S. Cl.
CPC ..................... *B60R 5/00* (2013.01)
(58) Field of Classification Search
CPC ......... B60R 5/00; B60P 7/0815; B60P 7/0807
USPC ...................................... 296/37.1
See application file for complete search history.

(56) References Cited

U.S. PATENT DOCUMENTS

| 8,777,531 | B2 * | 7/2014 | Massicotte | B60P 7/0815 410/82 |
| 8,875,830 | B2 | 11/2014 | Massicotte et al. | |
| 12,384,288 | B2 * | 8/2025 | Vachon | B60P 7/0807 |
| 2015/0210355 | A1 * | 7/2015 | Labbe | B60R 9/06 224/408 |
| 2020/0331405 | A1 * | 10/2020 | Robillard | B62J 9/27 |
| 2024/0399950 | A1 * | 12/2024 | Rutman | B60P 7/10 |

FOREIGN PATENT DOCUMENTS

| CN | 119658604 A * | 3/2025 | F16B 2/18 |
| WO | WO-2024057319 A1 * | 3/2024 | F16B 5/10 |

* cited by examiner

*Primary Examiner* — Hilary L Gutman
(74) *Attorney, Agent, or Firm* — BCF LLP

(57) ABSTRACT

A storage box assembly for a vehicle includes a storage box having a wall, and a tongue assembly connected to the wall. The tongue assembly has a grip selectively movable between first and second positions, and first and second tongues connected to the grip and movable with the grip. When the grip is in the first position, the first tongue is in an operative position. A first spacing is defined between the first tongue and the wall for receiving a first retaining member having a first thickness between the first tongue and the wall. When the grip is in the second position, the second tongue is in an operative position. A second spacing is defined between the second tongue and the wall for receiving a second retaining member having a second thickness between the second tongue and the wall.

12 Claims, 25 Drawing Sheets

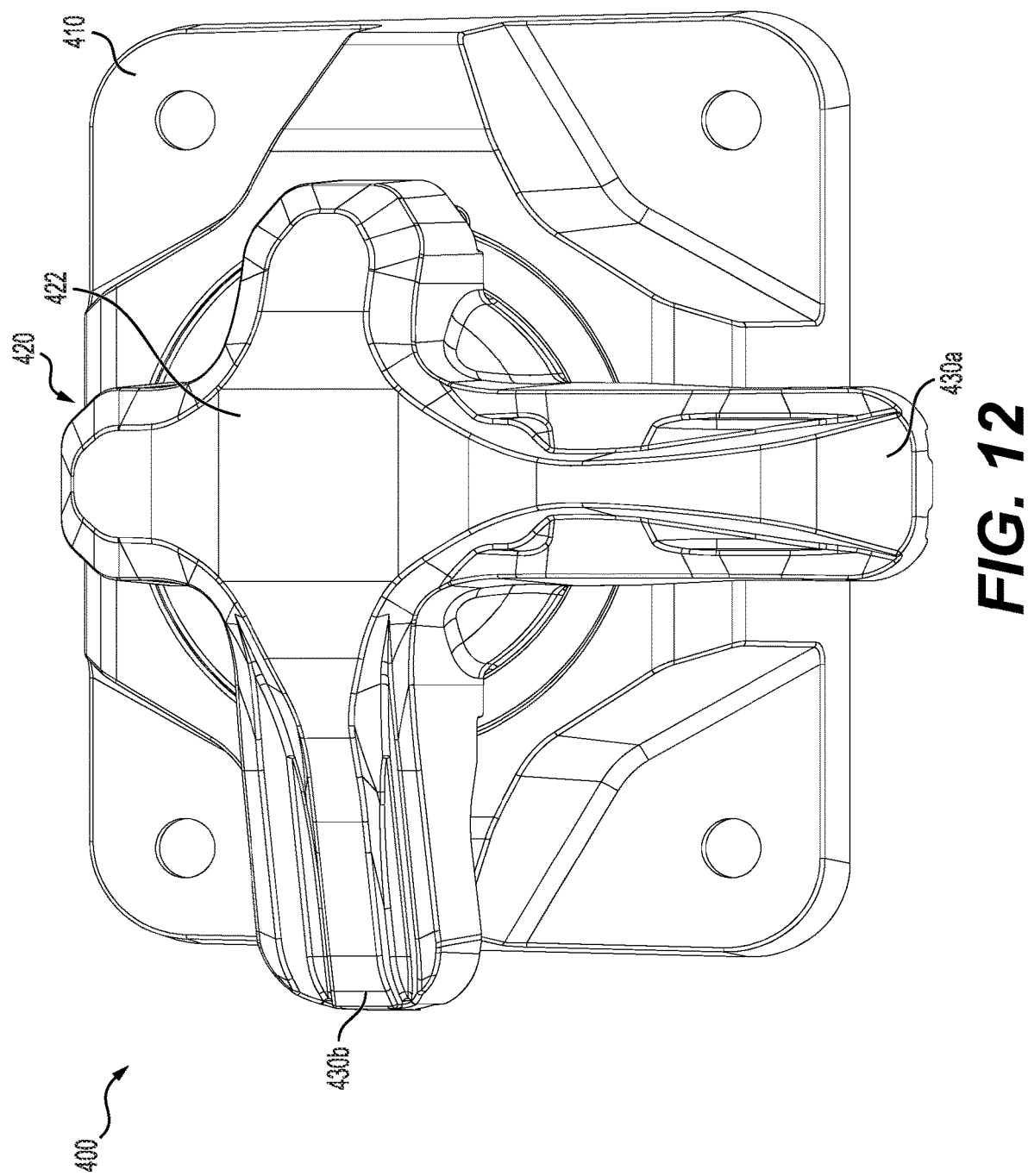

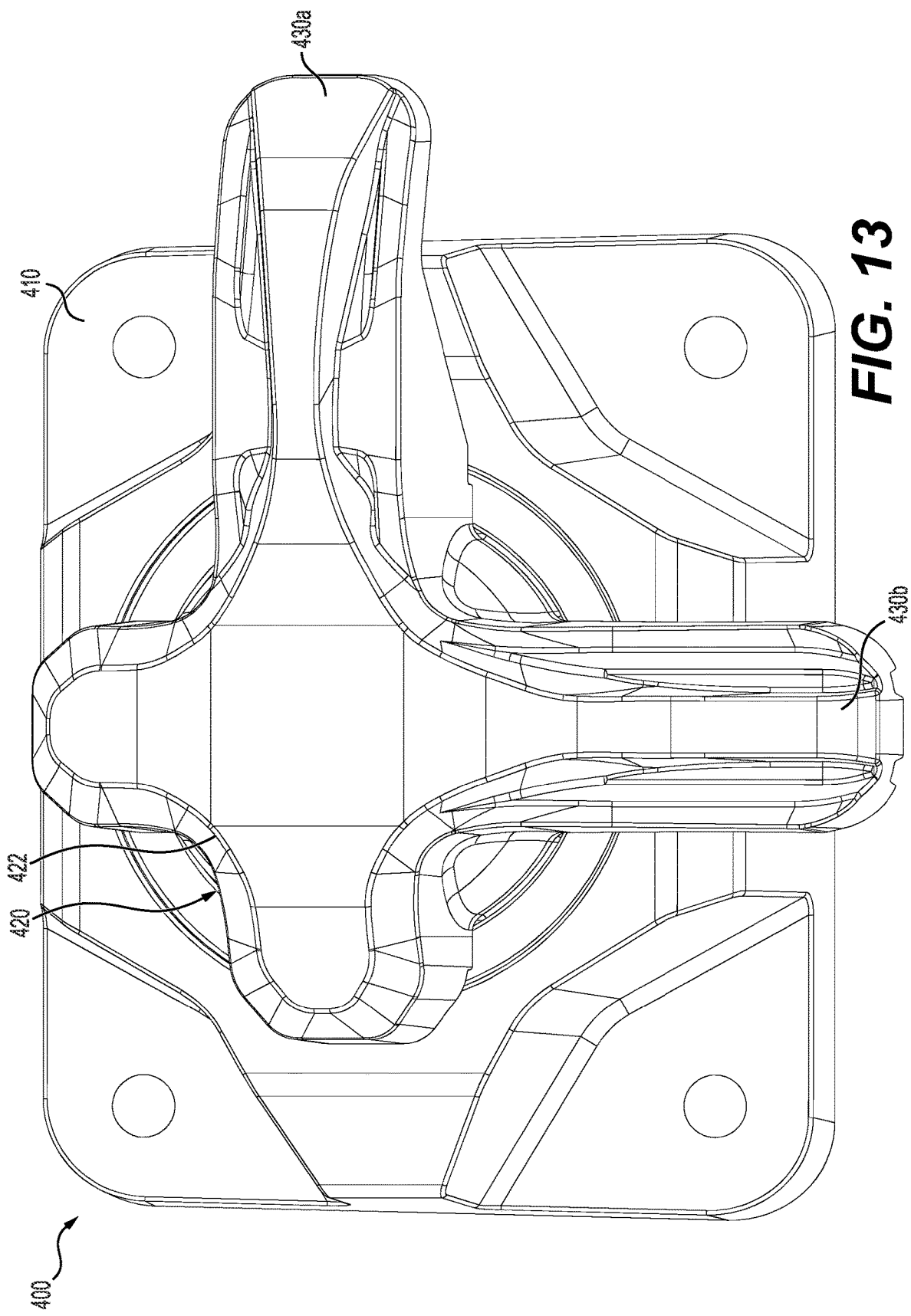

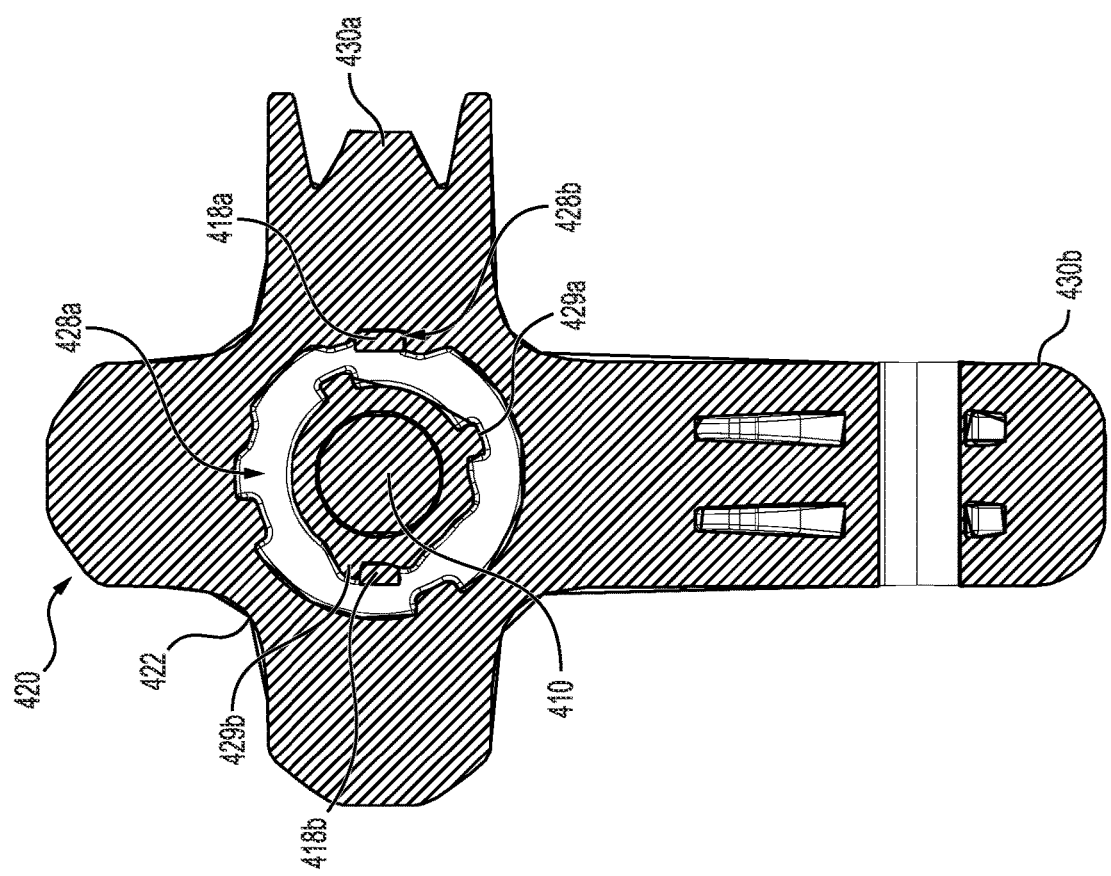

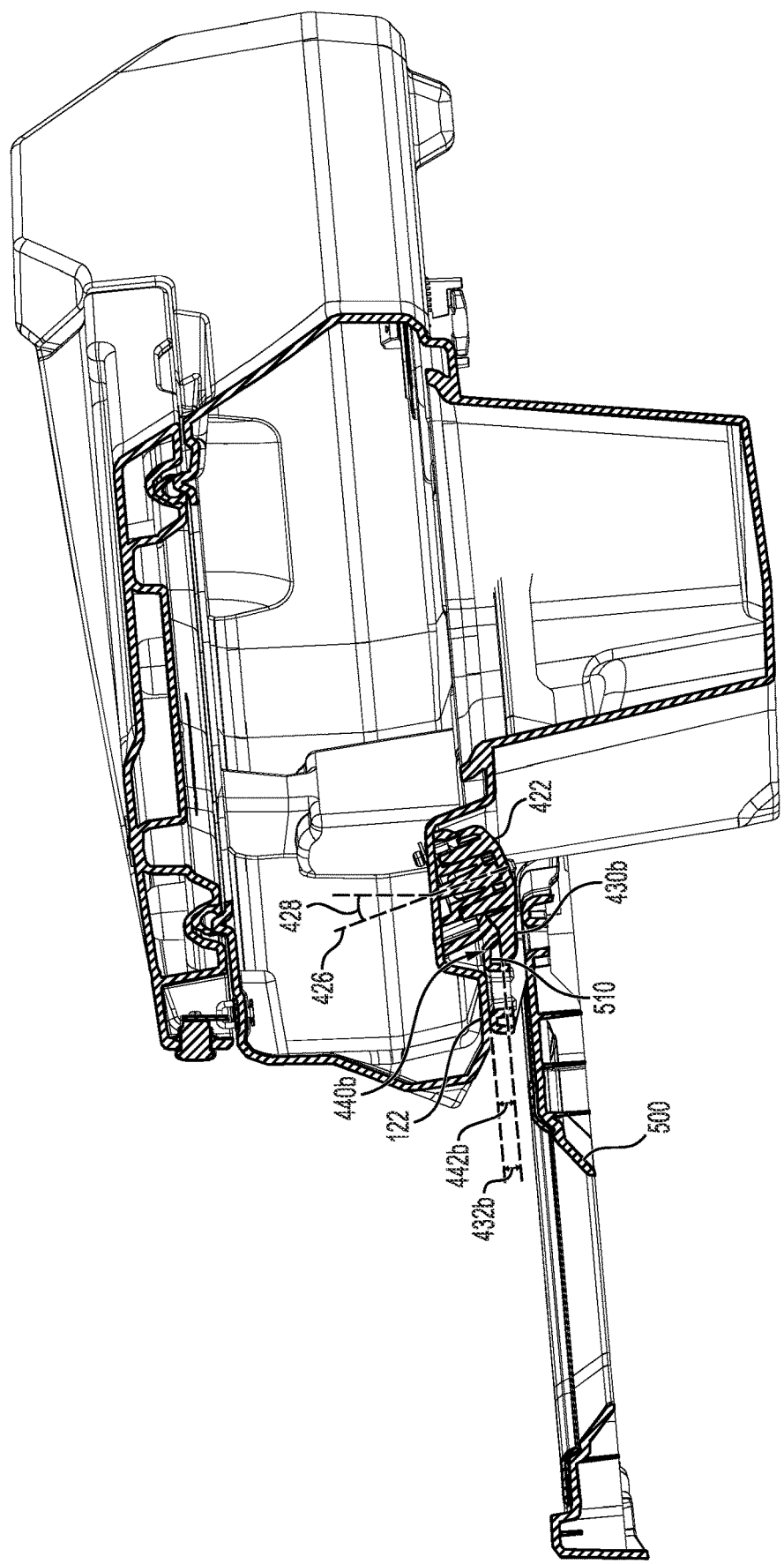

STORAGE BOX ASSEMBLY FOR A VEHICLE

CROSS-REFERENCE

The present application claims priority from U.S. Provisional Application No. 63/306,172, entitled "Storage Box Assembly for a Vehicle," filed Feb. 3, 2022, the entirety of which is incorporated by reference herein.

TECHNICAL FIELD

The present technology relates to storage box assemblies for vehicles.

BACKGROUND

Recreational vehicles such as personal watercrafts (PWCs), all-terrain vehicles (ATVs), side-by-side off-road vehicles (SSVs), snowmobiles and the like are used for both utility and recreational purposes. As such, these may be used for transporting cargo and accessories needed for such purposes. It is thus desirable to have storage boxes connected to the recreational vehicle to carry such cargo and accessories, and that are convenient to remove from the recreational vehicle if needed.

Therefore, there is a desire for storage box assemblies for recreational vehicles that permit convenient connection to the vehicle when accessories and cargo are to be carried while the recreational vehicle is being operated, and that permit convenient removal from the recreational vehicle.

SUMMARY

It is an object of the present technology to ameliorate at least some of the inconveniences present in the prior art.

In one aspect, the present technology provides a storage box assembly for a vehicle. The storage box assembly includes a storage box having a wall, and a tongue assembly connected to the wall. The tongue assembly includes a grip selectively movable between a first position and a second position. First and second tongues are connected to the grip and movable with the grip between the first and second positions. In response to the grip being in the first position, the first tongue is in an operative position, and a first spacing is defined between the first tongue and the wall of the storage box for receiving a first retaining member having a first thickness between the first tongue and the wall. In response to the grip being in the second position, the second tongue is in an operative position, and a second spacing is defined between the second tongue and the wall of the storage box for receiving a second retaining member having a second thickness between the second tongue and the wall. The second spacing is smaller than the first spacing, and the second thickness is smaller than the first thickness.

In some implementations, the storage box assembly further includes a base connected to the wall, and the grip is movably connected to the base.

In some implementations, the grip is selectively pivotable relative to the base.

In some implementations, the grip pivots 90 degrees between the first and second positions.

In some implementations, the grip pivots about a pivot axis, and the pivot axis is skewed relative to the wall.

In some implementations, the base includes at least one arm projecting from the base. The grip defines a first recess adapted for receiving the at least one arm when the grip is pivoted in the first position, and a second recess adapted for receiving the at least one arm when the grip is pivoted in the second position. The at least one arm selectively retains the grip in one of the first position and the second position.

In some implementations, the grip, the first tongue and the second tongue are integrally formed.

In some implementations, the storage box assembly further includes at least one anchor mounted to the storage box for selectively securing the storage box assembly to the vehicle in collaboration with the tongue assembly.

In some implementations, the first retaining member is a frame member of the vehicle, and the first tongue is adapted to engage the frame member of the vehicle.

In some implementations, the second retaining member is an anchor fixture, and the second tongue is adapted for insertion into the anchor fixture.

In some implementations, the grip is a knob.

In some implementations, the first tongue is longer than the second tongue.

For purposes of the present application, terms related to spatial orientation when referring to a vehicle and components in relation to the vehicle, such as "forwardly", "rearwardly", "left", "right", "top", "bottom", "upper", "lower" "above" and "below", are as they would be understood by a driver of the vehicle sitting thereon in an upright driving position, with the vehicle steered straight-ahead.

Should there be any discrepancies in the definitions of terms in this application and the definition of these terms in any document included herein by reference, the definition of such terms as defined in the present application take precedence.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 12 is a bottom plan view of the tongue assembly of FIG. 8, with a grip moved in a frame engaging position;

FIG. 13 is a bottom plan view of the tongue assembly of FIG. 8, with the grip moved in the anchor engaging position;

FIG. 14C is a cross-sectional view of the tongue assembly of FIG. 8 taken along cross-section line 14-14 of FIG. 8, with the grip moved in the anchor engaging position;

FIG. 21 is longitudinal cross-sectional view of the rack and the storage box assembly of FIG. 19, with the grip in the anchor engaging position and with the tongue of the tongue assembly secured to the anchor fixture of the rack.

DETAILED DESCRIPTION

In the following description, an implementation of a storage box assembly 100 for a vehicle 10 will be described. The storage box assembly 100 that will be described herein is a front storage box assembly 100 for a straddle-seat all-terrain vehicle 10 (hereinafter ATV). It is contemplated that aspects of the storage box assembly 100 of the present technology could be used in other types of vehicles, such as three-wheeled vehicles, personal watercrafts (PWCs), side-by-side off-road vehicles (SSVs), motorcycles, and the like.

Figure 1:
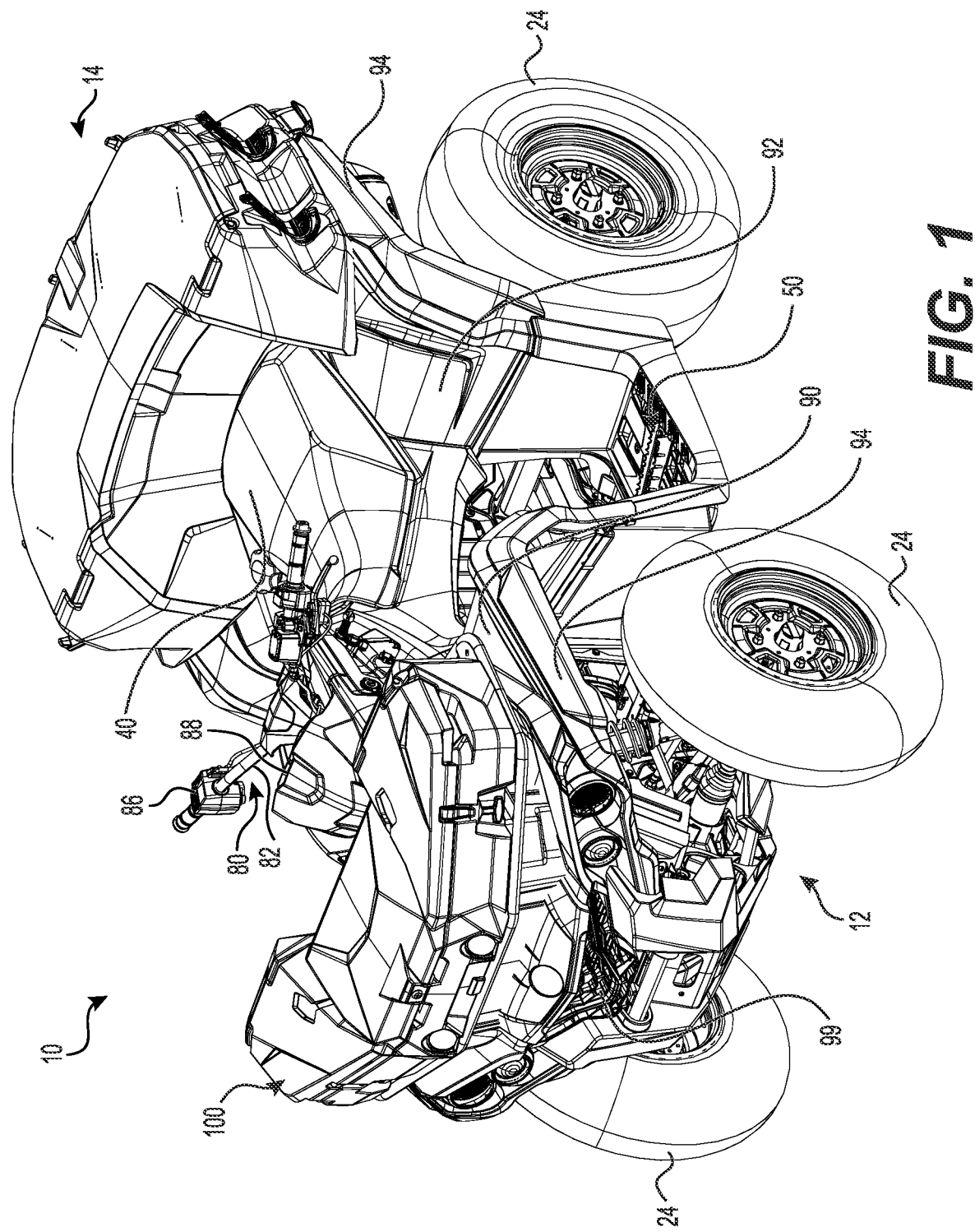
FIG. 1 is a perspective view taken from a top, front, left side of a straddle-seat all-terrain vehicle (ATV), with front and rear storage box assemblies secured thereto.
Figure 2:
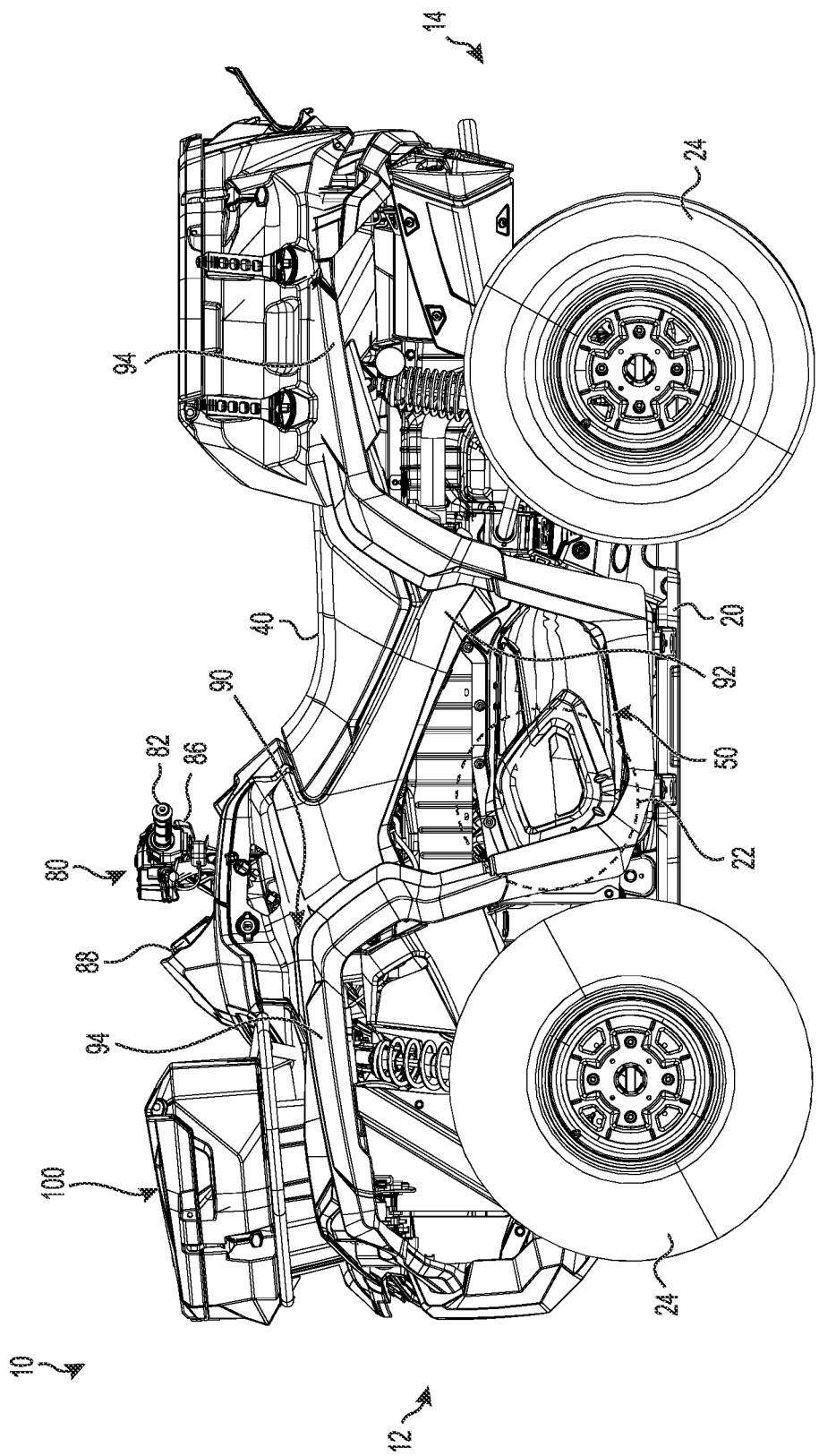
FIG. 2 is a left side elevation view of the vehicle of FIG. 1.
Figure 3:
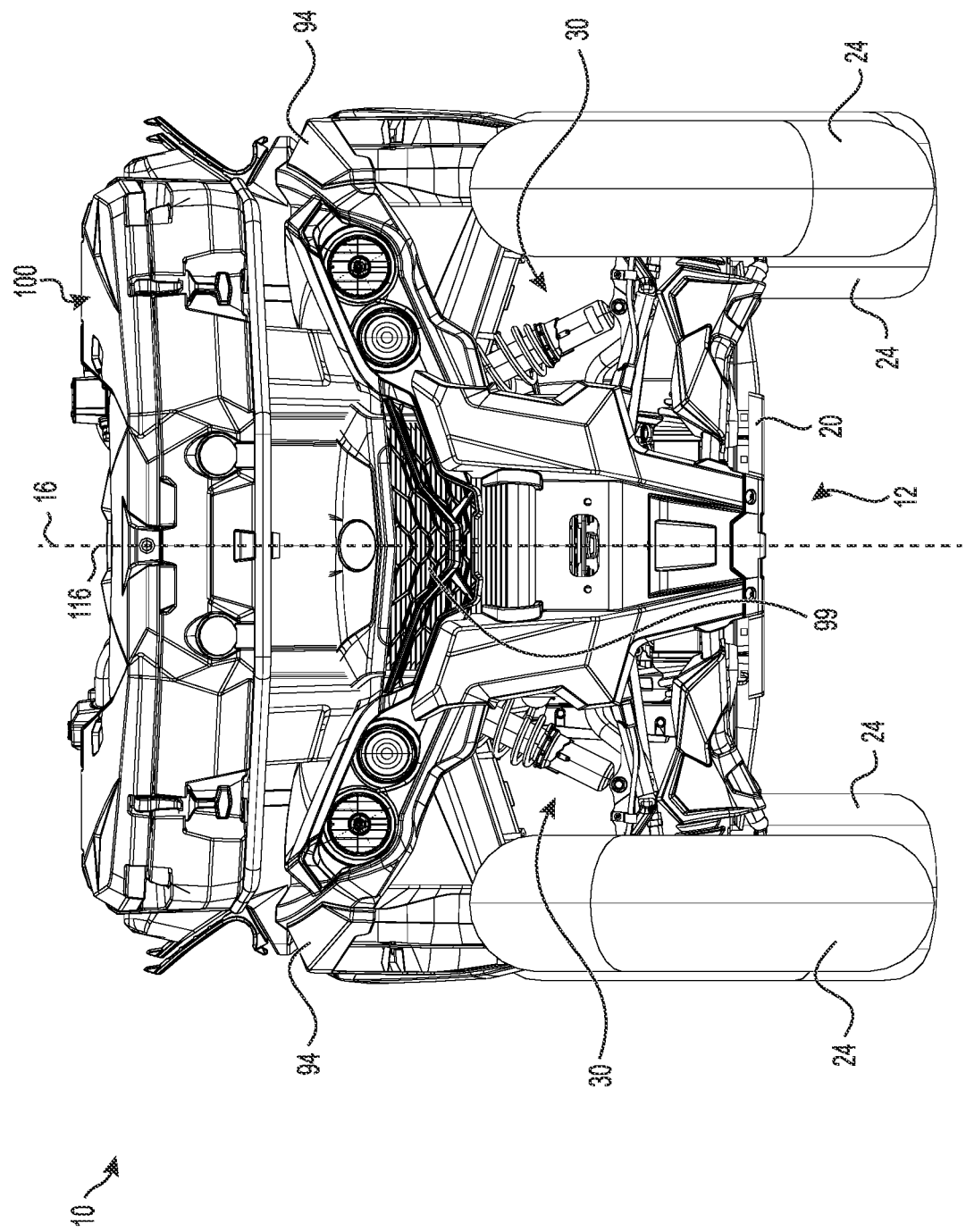
FIG. 3 is a front elevation view of the vehicle of FIG. 1.
Figure 4:
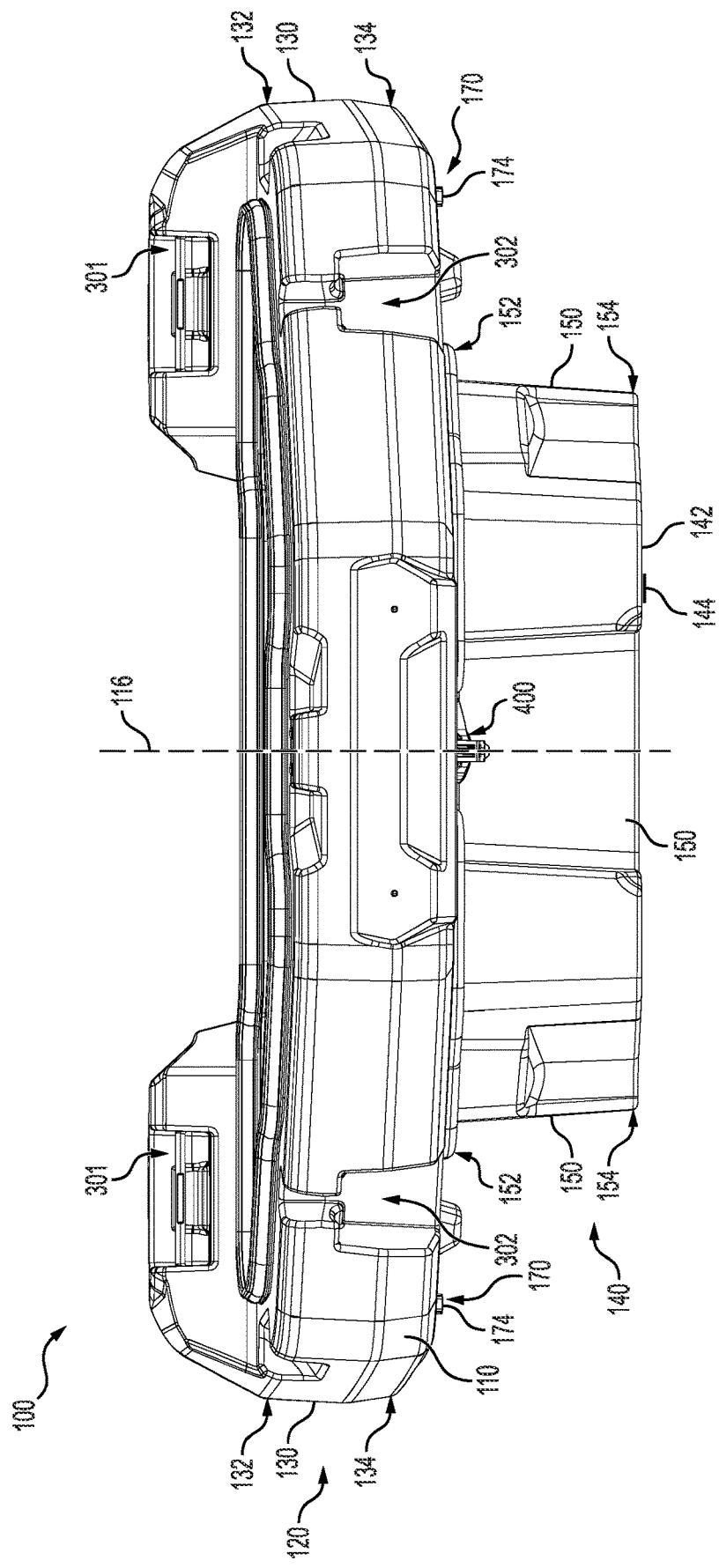
FIG. 4 is front elevation view of the front storage box assembly of FIG. 1, with the lid omitted.
Figure 15:
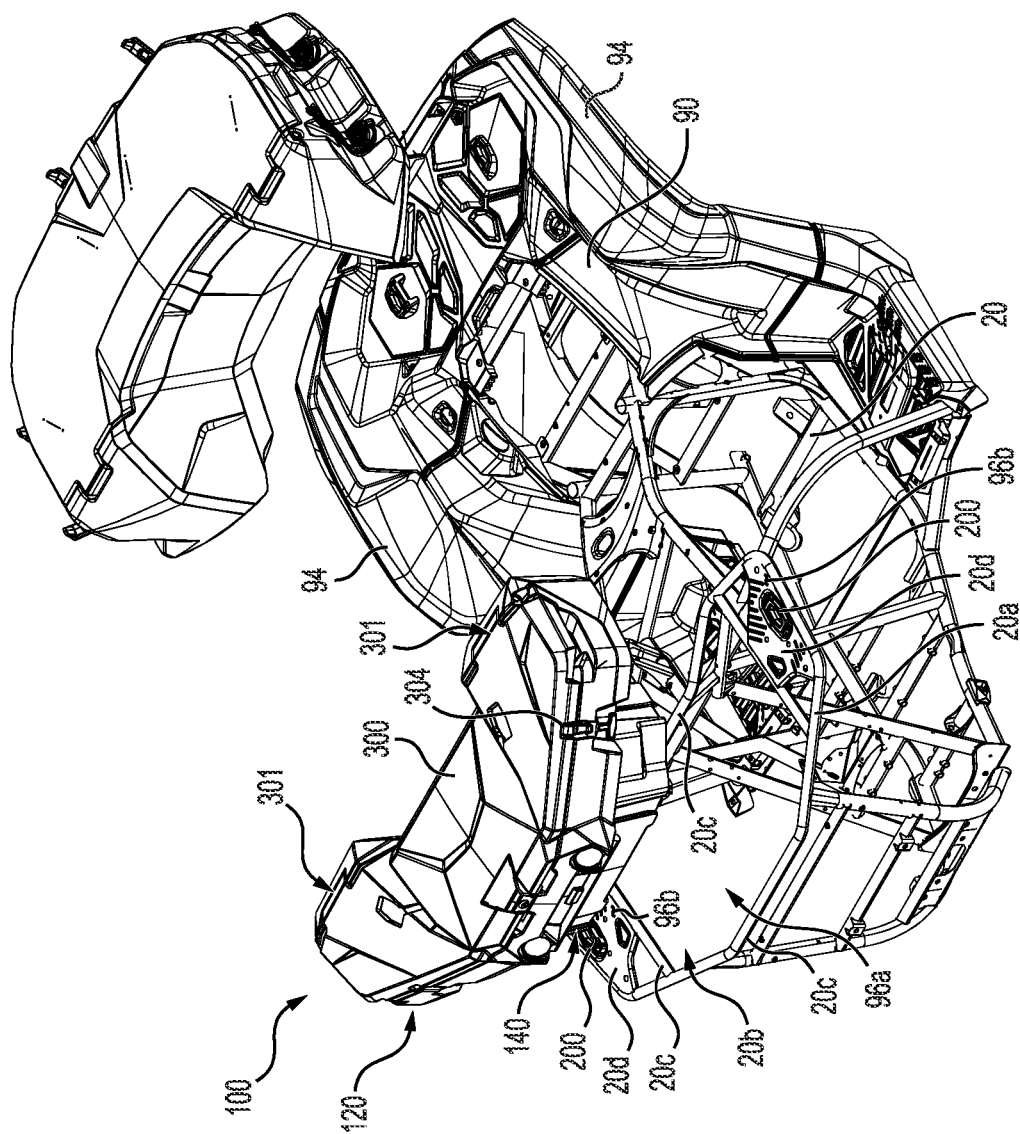
FIG. 15 is a perspective view taken from a top, front, left side of the frame and some body portions of the vehicle of FIG. 1, with the front storage box assembly shown removed from the vehicle.
Figure 16:
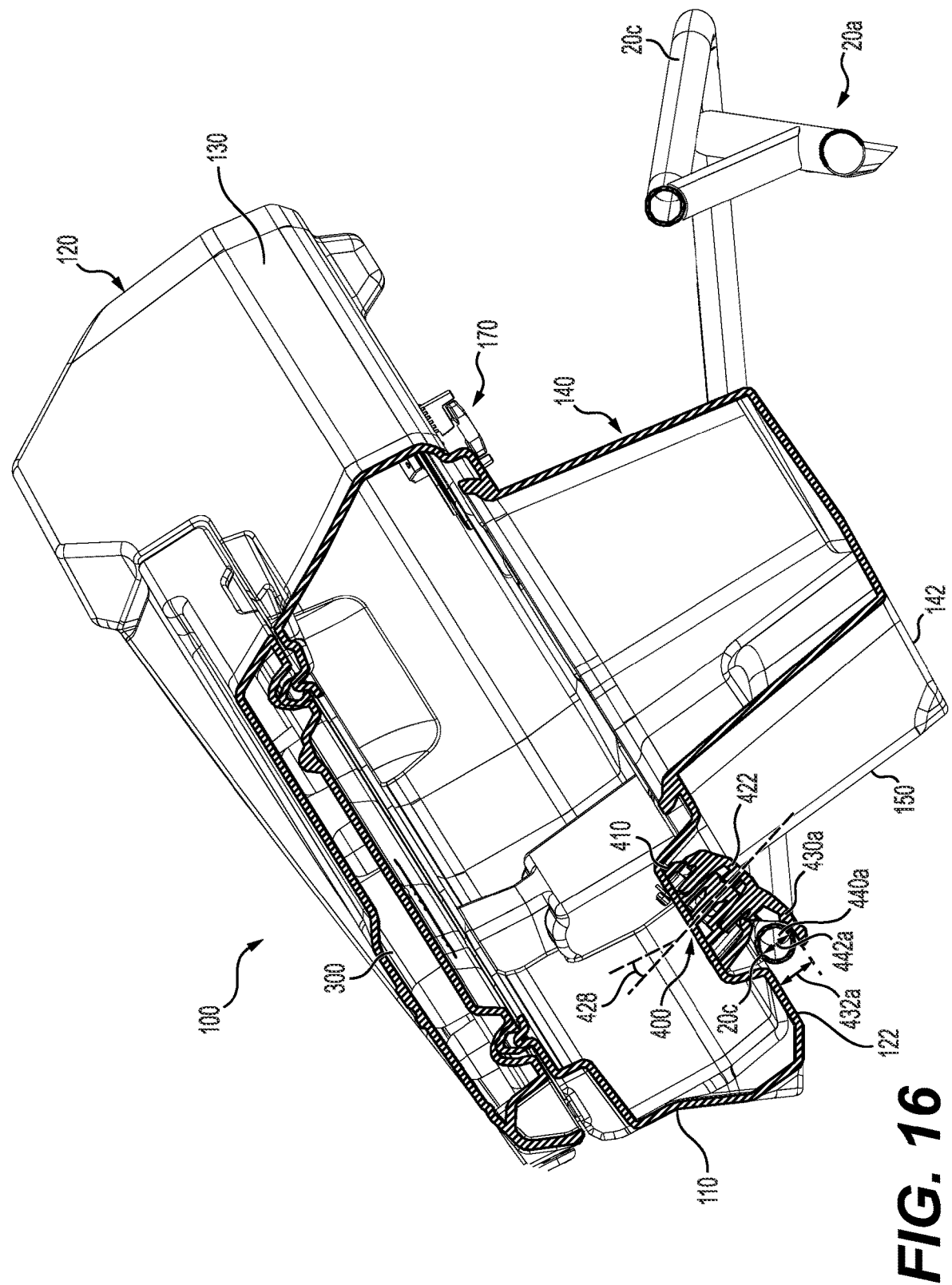
FIG. 16 is a longitudinal cross-sectional view of the front storage box assembly and a front portion of the frame of FIG. 15 supporting the front storage box assembly, with the front storage box assembly tilted forward, with the grip in the frame engaging position and with the tongue of the tongue assembly engaging a frame member of the frame.
Figure 17:
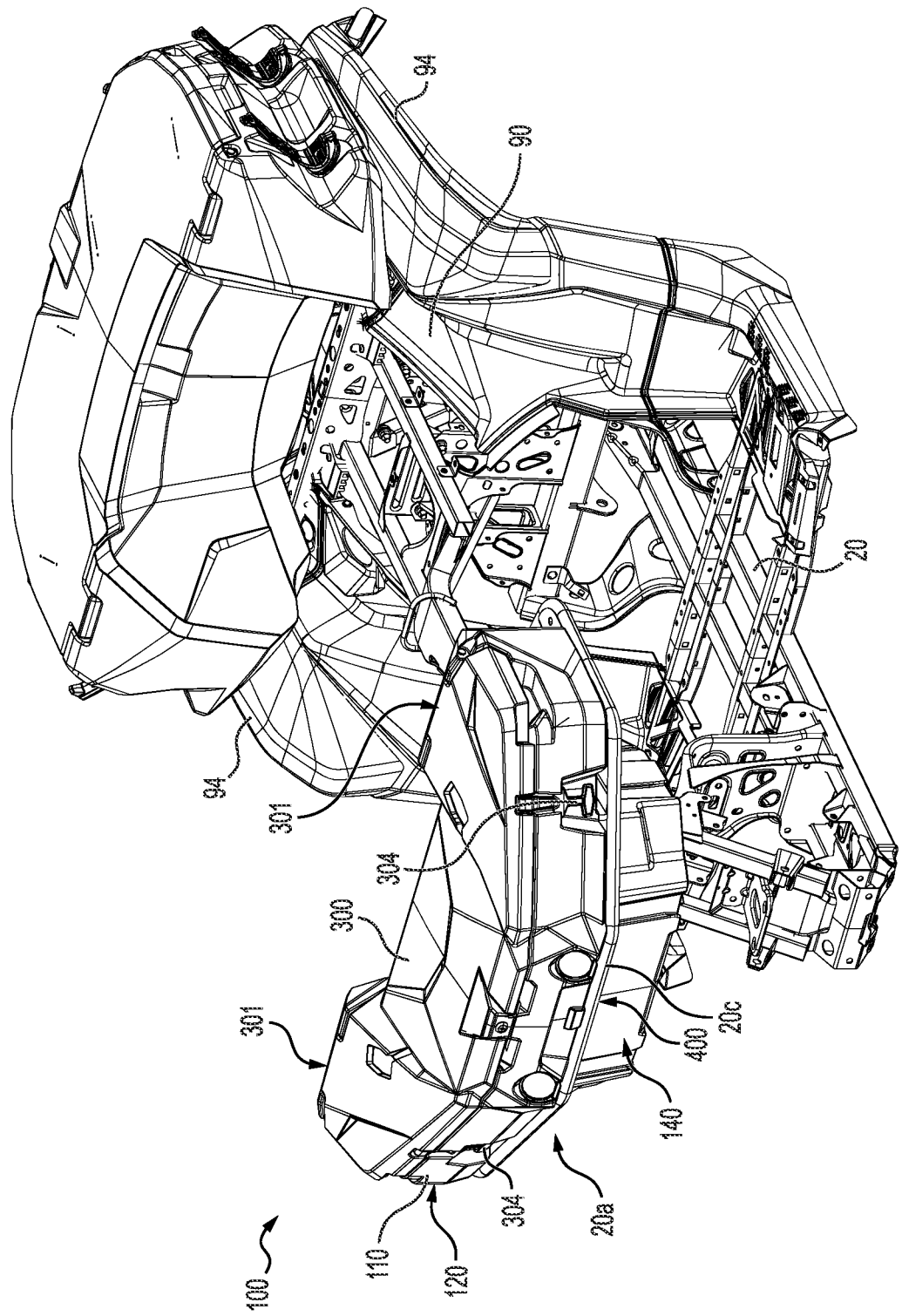
FIG. 17 is a perspective view taken from a top, front, left side of the frame and body portions of FIG. 15, with the front storage box assembly secured to the vehicle.

Before describing the storage box assembly 100 in details, the ATV 10 will be generally described. Referring to FIGS. 1 to 3, the ATV 10 has a front end 12 and a rear end 14 defined consistently with a forward travel direction of the ATV 10. A longitudinal center plane 16 (FIG. 3) extends vertically and longitudinally through the lateral center of the ATV 10. The ATV 10 has a frame 20. As best seen in FIGS. 15 to 17, the frame 20 has a portion 20a defining an opening 20b for receiving the front storage box assembly 100 at least in part therein. More details related to the disposition and securing of the front storage box assembly 100 on the ATV 10 will be provided below. The portion 20a of the frame 20 is formed by tubular members 20c and planar members 20d of the frame 20.

Referring back to FIGS. 1 to 3, a motor 22 (schematically shown in FIG. 2) is connected to the frame 20 for powering the ATV 10. The ATV 10 has two front wheels 24 and two rear wheels 24. The wheels 24 are operatively connected to the motor 22 via a transmission (not shown). In the present implementation, the motor 22 is an internal combustion engine and the transmission is a continuously variable transmission, but other types of motors and transmissions are contemplated. Each of the four wheels 24 is provided with low-pressure balloon tires adapted for off-road conditions and traversing rugged terrain. It is contemplated that other implementations of the ATV 10 could have only three wheels 24. The two front wheels 24 are suspended from the frame 20 by left and right front suspension assemblies 30 (FIG. 3) while the two rear wheels 24 are suspended from the frame 20 by left and right rear suspension assemblies (not shown).

Still referring to FIGS. 1 to 3, the ATV 10 further includes a straddle seat 40 connected to the frame 20 for accommodating a driver of the ATV 10. Driver footrests 50 are provided on either side of the driver seat 40 and are disposed vertically lower than the driver seat 40 to support the driver's feet. A steering assembly 80 is rotationally connected to the frame 20 to enable a driver to steer the ATV 10. The steering assembly 80 includes a handlebar 82 connected to a steering column assembly 84 for actuating steering linkages operatively connected to the left and right front wheels 24. Other steering input devices, such as a steering wheel, could be used in different vehicles.

A throttle operator 86 (FIGS. 1 and 2), in the form of a thumb-actuated throttle lever, is mounted to the handlebar 82. Other types of throttle operators, such as a finger-actuated throttle lever and a twist grip, are also contemplated. A gear shifter (not shown) located near the handlebar 82 is connected to the transmission and enables a driver to select one of a plurality of gear configurations for operation of the ATV 10. In the illustrated implementation of the ATV 10, the gear configurations include park, neutral, reverse, low, and drive. It is contemplated that the sequence and/or number of gear configurations could be different than as shown herein. A display cluster 88, including a number of gauges and buttons, is disposed forwardly of the steering assembly 80.

The ATV 10 also has cowlings 90 including several side panels 92 extending over the lateral sides of the ATV 10, and fenders 94 disposed over each of the wheels 24. As best seen in FIGS. 15 to 17, a front receptacle 96a is provided on the ATV 10 for supporting the front storage box assembly 100. The front receptacle 96a is formed by the opening 20b of the portion 20a of the frame 20, and by a top surface 96b defined by the planar members 20d of the portion 20a of the frame 20. The receptacle 96a is disposed rearward of a front grille 99 (FIG. 3) and the cowlings 90 forming the front fascia of the ATV 10. When the font storage box assembly 100 is received at least in part in the front receptacle 96a, the front storage box assembly 100 is disposed forwardly of the handlebar 82 of the ATV 10.

The ATV 10 further includes other components such as an air intake system, an exhaust system, headlights, and the like. As it is believed that these components would be readily recognized by one of ordinary skill in the art, further explanation and description of these components will not be provided herein.

The storage box assembly 100 will now be described in more details with reference to FIGS. 4 to 7B. The front storage box assembly 100 includes a box 110 having an upper portion 120 and a lower portion 140. The upper portion 120 includes a bottom wall 122 defining left and right recesses 128. The upper portion 120 further includes side walls 130 extending from bottom wall 122 and above the bottom wall 122. The side walls 130 have an upper end 132 and a lower end 134 defined consistently with a vertical direction of the front storage box assembly 100 when secured to the ATV 10.

The lower portion 140 of the box 110 includes a bottom wall 142 and side walls 150. The bottom wall 142 has a lower surface 144 facing downwardly when the storage box assembly 100 is connected to the ATV 10. The side walls 150 of the lower portion 140 have an upper end 152 and a lower end 154. Upper portions of the side walls 150 collectively define an intermediate wall 151 having a surface 151a facing downwardly when the front storage box assembly 100 is secured to the ATV 10. The intermediate wall 151 extends above the bottom wall 142 and the below the bottom wall 122. The side walls 150 extend from the bottom wall 122 below the bottom wall 122. As such, the upper end 152 of the side walls 150 is connected to the bottom wall 122.

Still referring to FIGS. 4 to 7B, a longitudinal center plane 116 extends vertically and longitudinally through the lateral center of the box 110. The longitudinal center plane 116 is coplanar with the longitudinal center plane 16 of the ATV 10 when the storage box assembly 100 is secured to the ATV 10, as shown in FIG. 3.

Still referring to FIGS. 4 to 7B, the storage box assembly 100 further includes left and right anchors 170 mounted to the box 110 for selectively securing the storage box assembly 100 to the ATV 10. As best seen in FIGS. 5 to 7B, the left and right anchors 170 project from the bottom wall 122. The left and right anchors 170 are also disposed on opposite sides of the longitudinal center plane 116 of the box 110. The left and right anchors 170 selectively secure the box 110 to the ATV 10 when inserted in corresponding left and right apertures 200 (FIG. 15) defined on the ATV 10 and upon rotation of a lever (not shown) provided on each of the left and right anchors 170. In the present implementation, the left and right anchors 170 are similar to the anchor described in U.S. Pat. No. 8,875,830 B2, the entirety of which is incorporated by reference herein. The anchors 170 could be configured otherwise in other implementations of the present technology.

Referring to FIGS. 4 to 7B, the left and right anchors 170 each include a latch 174 that is connected to the lever. The latch 174 includes a pair of cams 176 (FIGS. 6A to 7B) constituting a lower flange 178 of each of the anchors 170. The pair of cams 176 defines a hexagonal shape that is congruent with the corresponding aperture 200 provided on the ATV 10 which is shaped for receiving the latch 174 of the corresponding anchor 170. As best seen in FIG. 15, the left and right apertures 200 are defined in the planar members 20d of the portion 20a of the frame 20, and have a hexagonal shape that is congruent with the pair of cams 176 of the left and right latches 174. On each of the left and right anchors 170, the latch 174 (and the pair of cams 176) is rotatable between an unlocked position (FIG. 6B) and a locked position (FIG. 7B) when the lever is rotated by about 90 degrees. The left and right anchors 170 are manually-operable anchors. Thus, the left and right anchors 170 can be configured in the unlocked and locked positions upon manual operation of the left and right levers and without any tools. In other words, when the left and right lower flanges 178 extend through the left and right apertures 200 and are configured in the locked position, the lower flanges 178 are rotated by about 90 degrees and are retained by the planar members 20d of the portion 20a of the frame 20 since their hexagonal shape is no longer congruent with the hexagonal shape of the apertures 200.

It is to be noted that the left and right levers are disposed inside the box 110, and thus the left and right anchors 170 are operable from inside the box 110. As shown in FIGS. 6A to 7B, the left and right latches 174 are disposed at least in part within the left and right recesses 128. Each of the left and right latches 174 also defines a bottom surface 180 (FIGS. 4, 6B and 7B) of the corresponding left and right anchors 170. The bottom surfaces 180 of the left and right anchors 170 is vertically spaced from the lower surface 144 of the bottom wall 142. More particularly and as best seen in FIGS. 4 and 6A to 7B, the bottom surfaces 180 of the left and right anchors 170 are disposed between the upper end 132 of the side walls 130 and the bottom wall 142. This positioning of the bottom surfaces 180 of the left and right anchors 170 relative to the lower surface 144 of the bottom wall 142 is advantageous in different ways because, when the box 110 is disposed on a flat surface, the left and right anchors 170 do not bear a load caused by the weight of the box 110 and its content. In addition, in situations where the box 110 lies on a muddy or snowy ground surface, the left and right latches 174, being vertically spaced from the lower surface 144 of the bottom wall 142, are less exposed to mud, snow or debris that could become stuck thereon.

Referring back to FIGS. 1 to 3, the storage box assembly 100 further includes a lid 300 pivotally connected to the upper portion 120 of the box 110. The lid 300 selectively prevents access to the box 110 when closed. The lid 300 is removably connected to the box 110. When connected, the lid 300 is pivotally connected to the box 110 via hinge assemblies 301 connected to the rear side wall 130. The front side wall 130 defines recesses 302 in which stretchable rubber straps 304 connected to the lid 300 are receivable for securing the lid 300 to the box 110 in the closed position shown in FIGS. 1 to 3. When the stretchable rubber straps 304 are withdrawn from the recesses 302, the lid 300 can be moved in the open position, shown in FIGS. 10 and 11.

Figure 5:
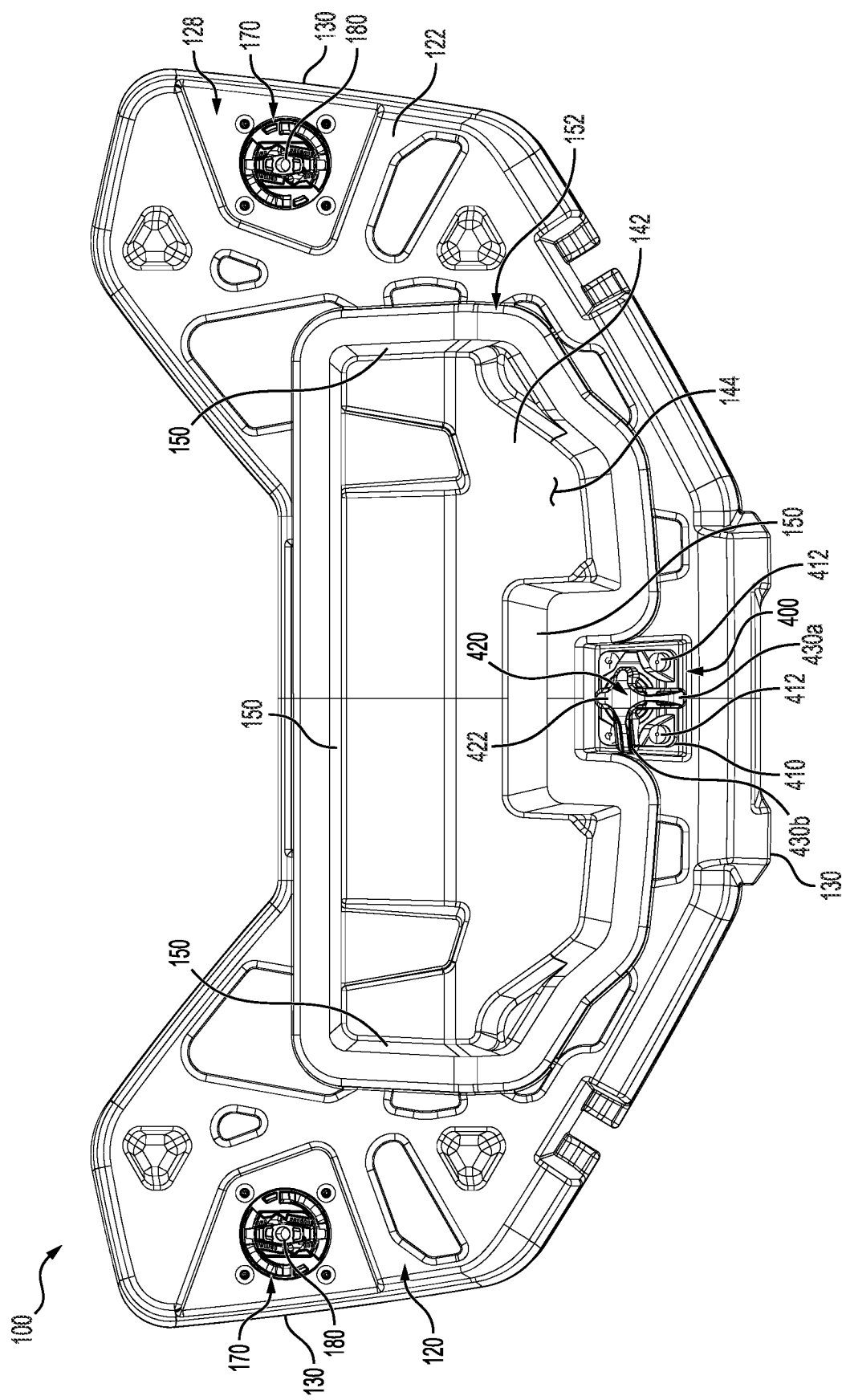
FIG. 5 is a bottom plan view of the front storage box assembly of FIG. 4, with the left and right anchors in an unlocked position.
Figure 6A:
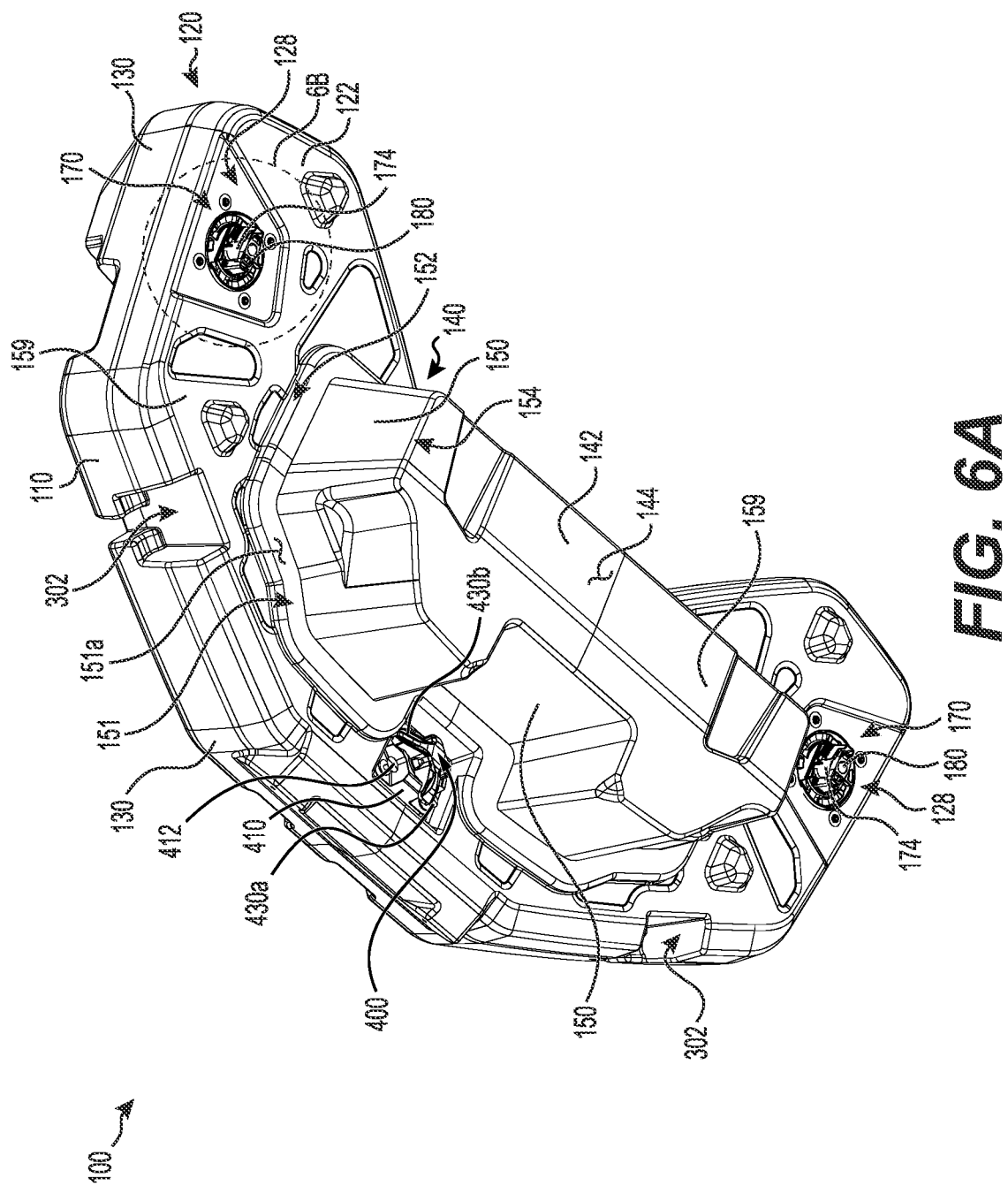
FIG. 6A is a perspective view taken from a bottom, front, left side of the front storage box assembly of FIG. 5.
Figure 6B:
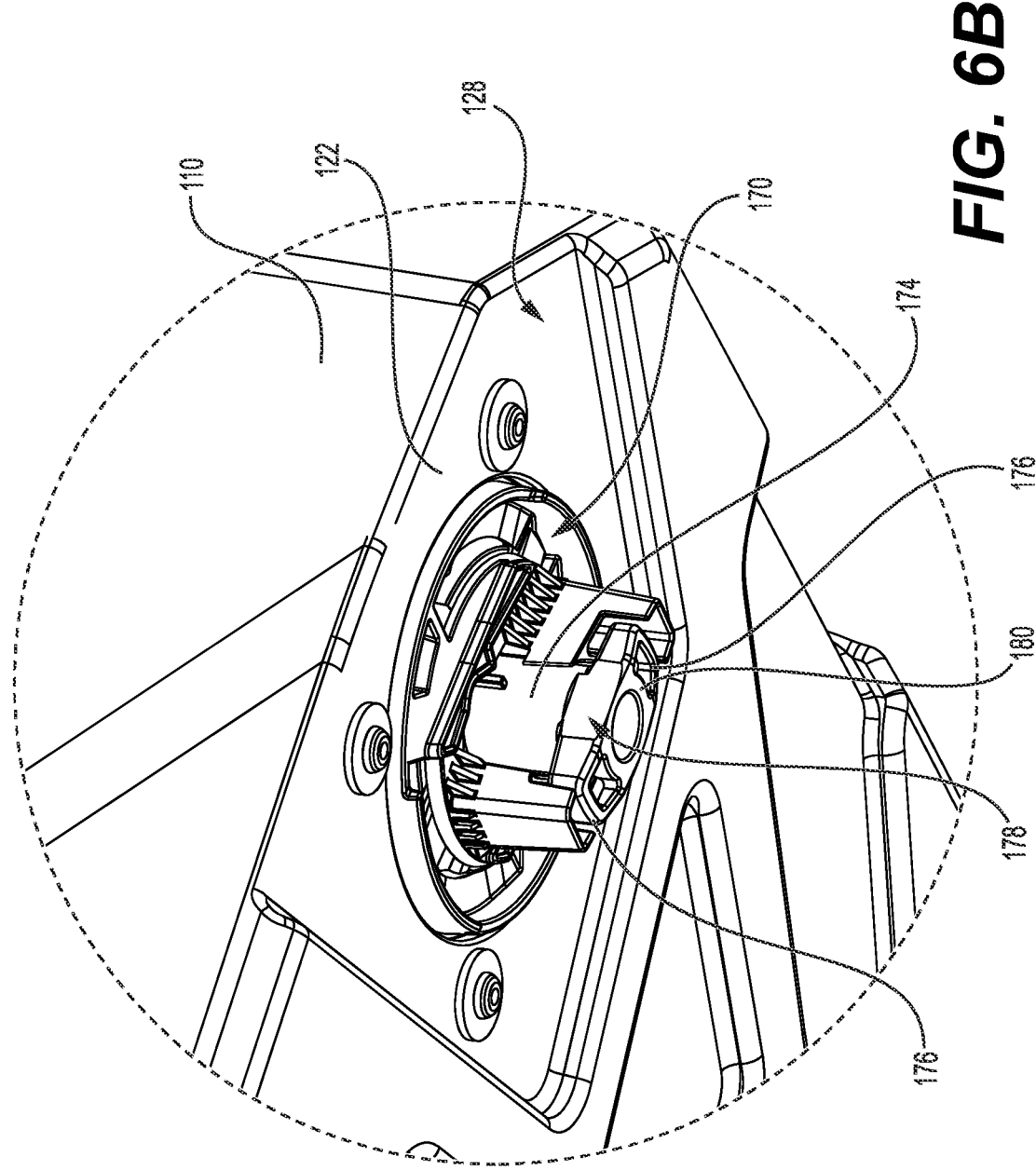
FIG. 6B is an enlarged view of portion 6B of FIG. 6A.
Figure 7A:
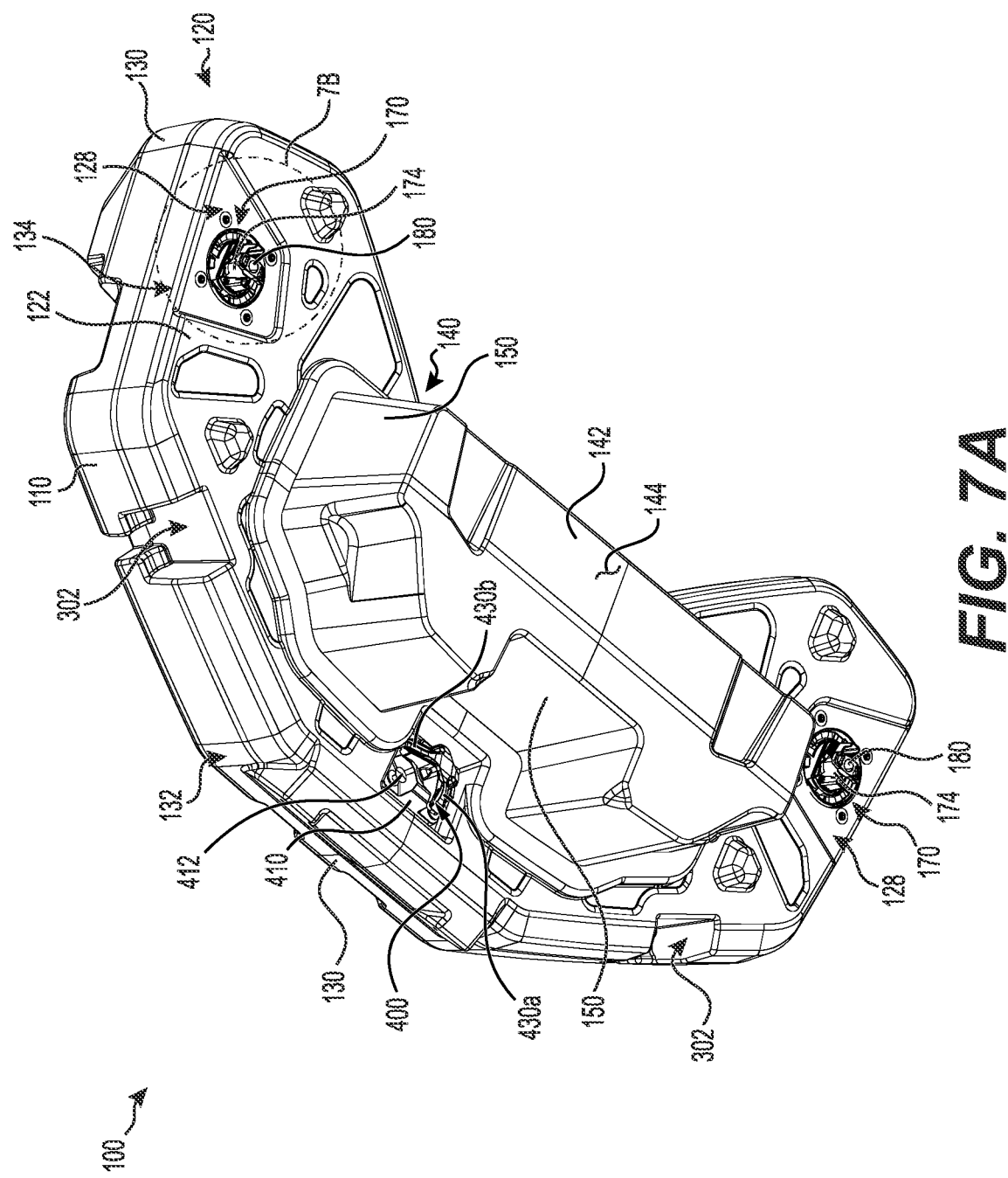
FIG. 7A is a perspective view taken from a bottom, front, left side of the front storage box assembly of FIG. 4, with the left and right anchors in a locked position.
Figure 7B:
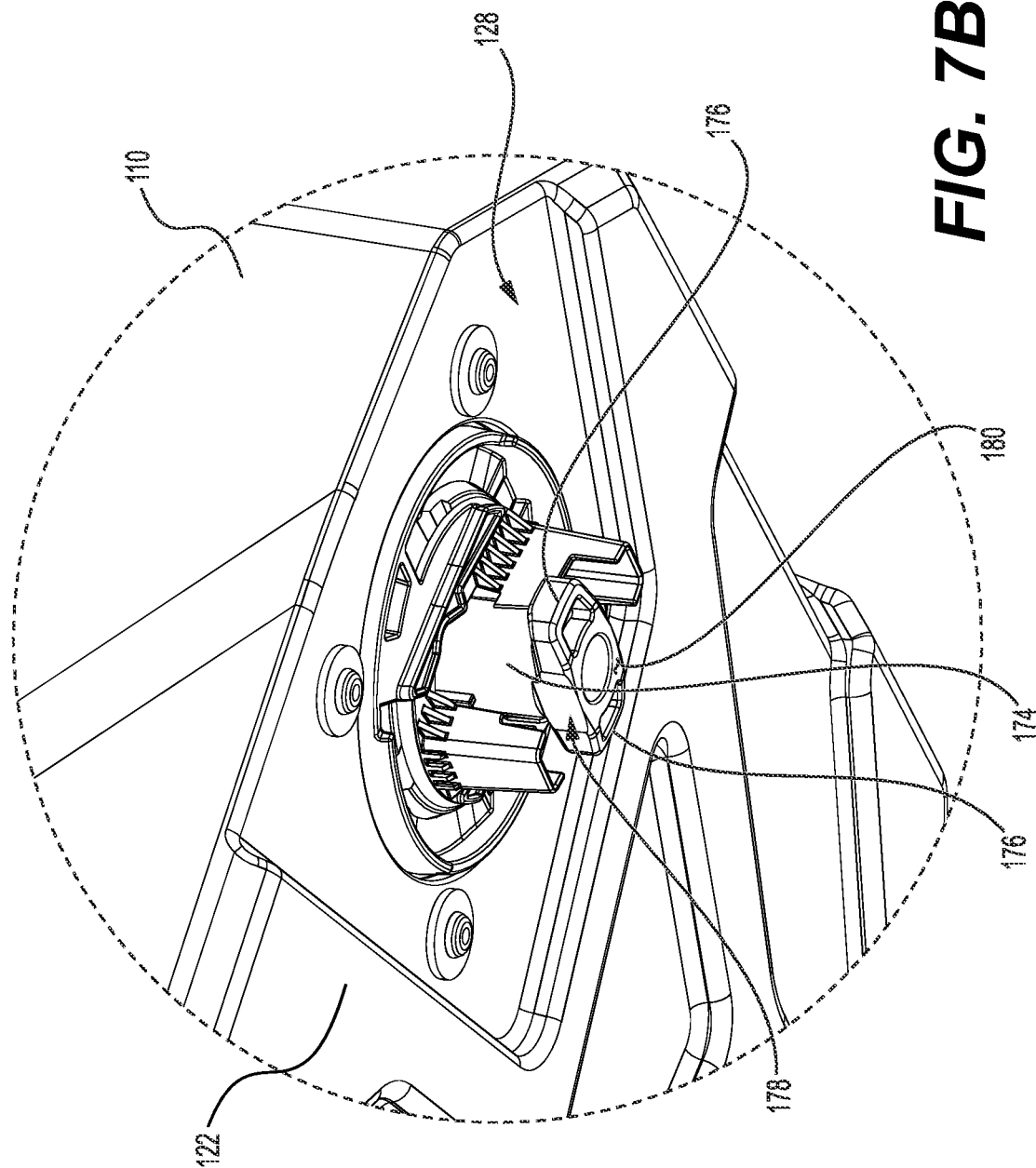
FIG. 7B is an enlarged view of portion 7B of FIG. 7A.
Figure 8:
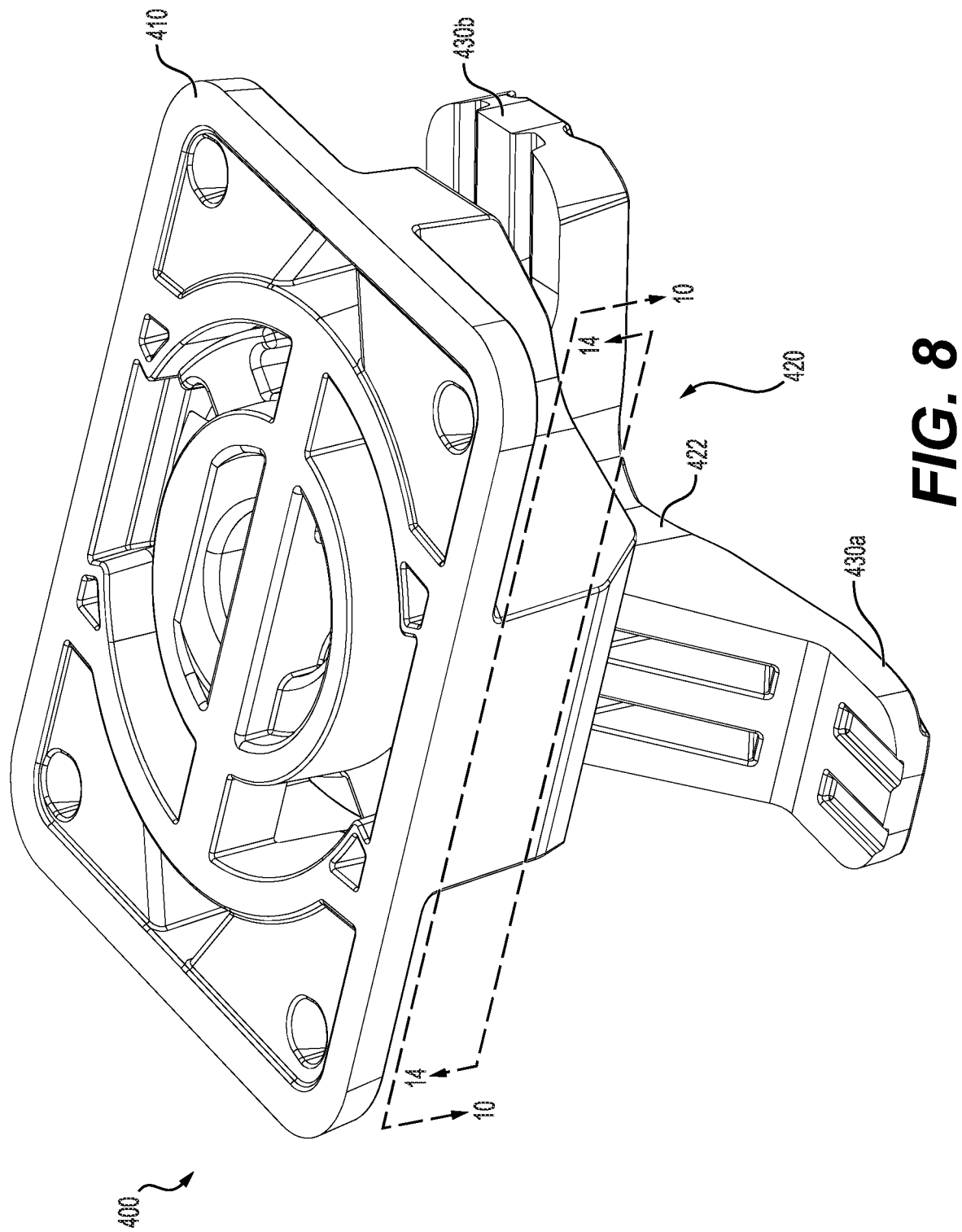
FIG. 8 is a perspective view, taken from a top, front, left side of a tongue assembly of the storage box assembly of FIG. 4.
Figure 18:
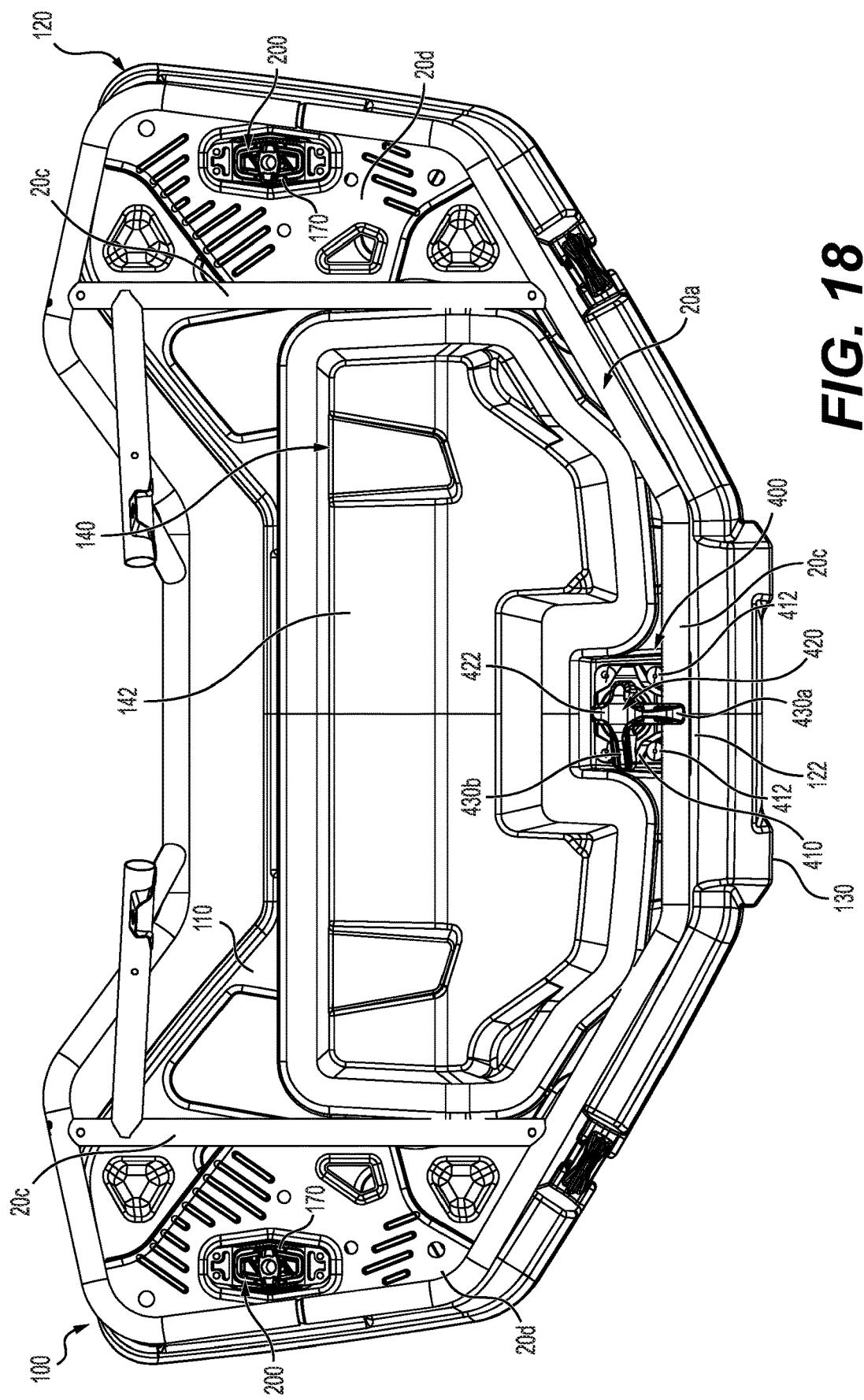
FIG. 18 is a bottom plan view of the front portion of the frame of FIG. 16 supporting the front storage box assembly.
Figure 19:
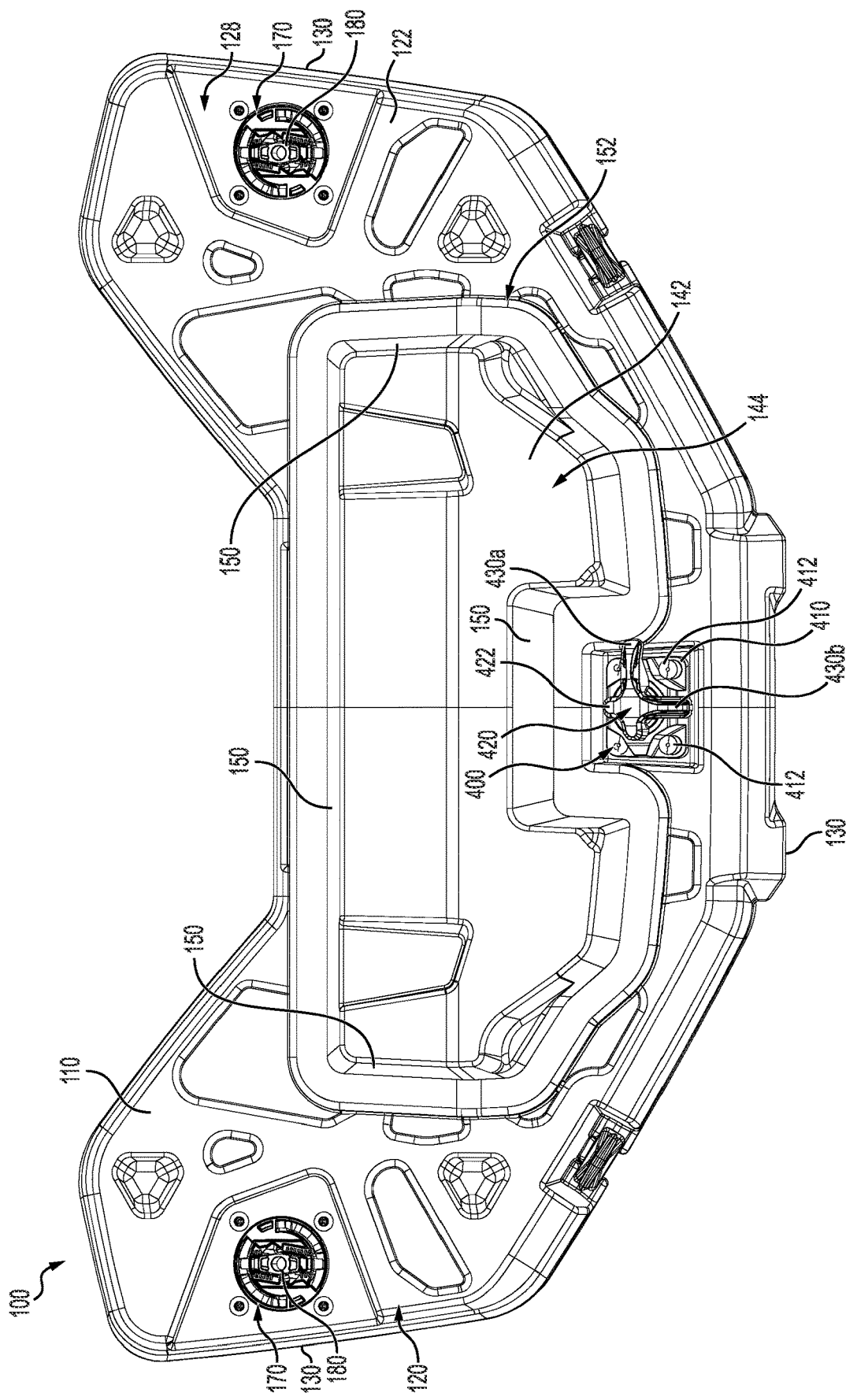
FIG. 19 is a bottom plan view of the front storage box assembly of FIG. 4, with the grip of the tongue assembly moved in the anchor engaging position.

Referring now to FIGS. 8 to 14C, the storage box assembly 100 further includes a tongue assembly 400 adapted to further secure the storage box 110 to the ATV 10 in collaboration with the left and right anchors 170. The tongue assembly 400 will now be described in more details. The tongue assembly 400 is connected to the bottom wall 122 of the storage box 110, as seen in FIGS. 5, 6A and 7A. More particularly, the tongue assembly 400 includes a base 410 that is connected to the bottom wall 122 via fasteners 412 (FIGS. 18 and 19). A grip 420 defined by knob 422 is connected to the base 410, and is selectively movable between a frame engaging position (FIG. 12) and an anchor engaging position (FIG. 13).

Figure 9:
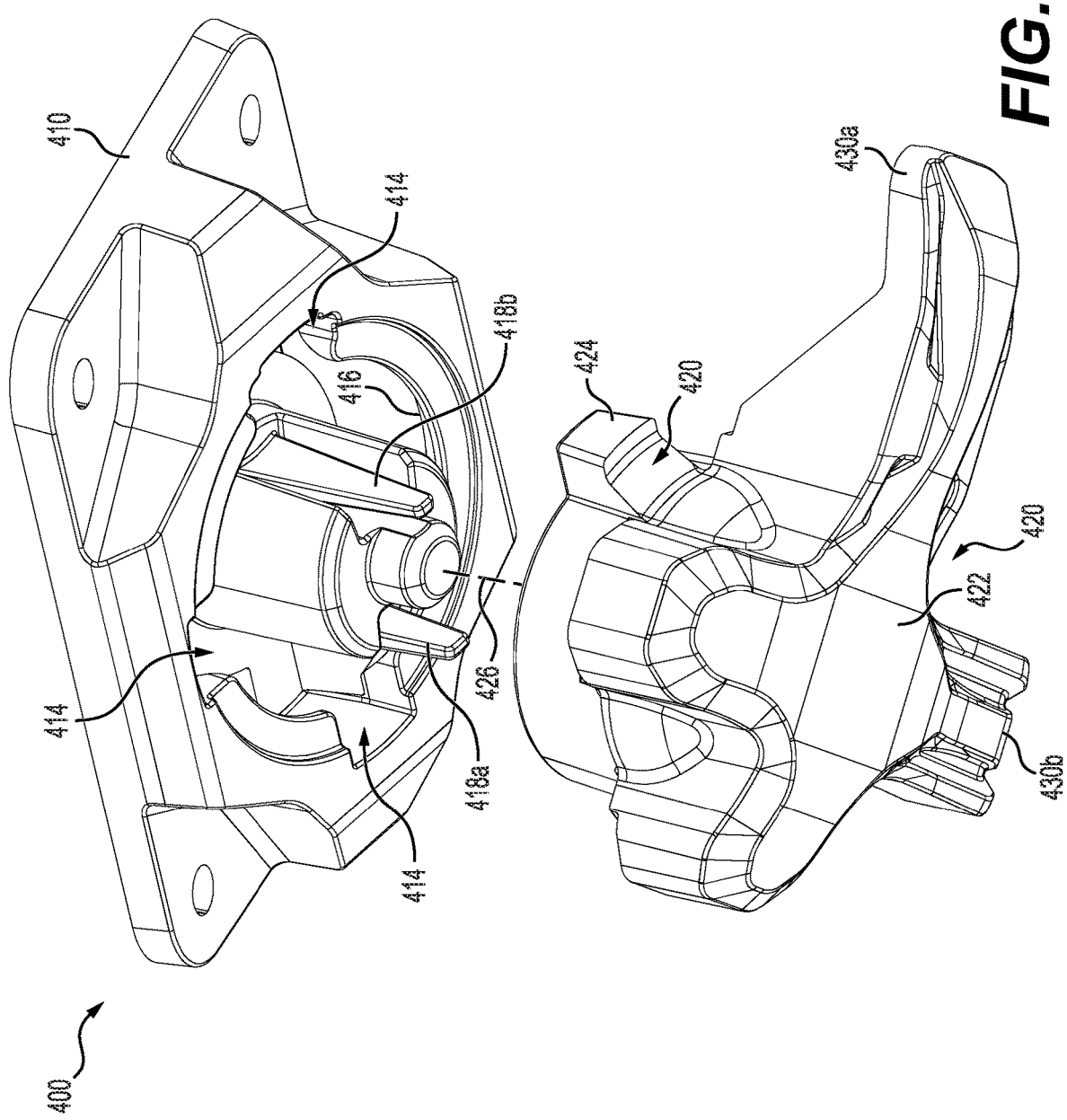
FIG. 9 is an exploded, perspective view taken from a bottom, rear, right side of the tongue assembly of FIG. 8.
Figure 10:
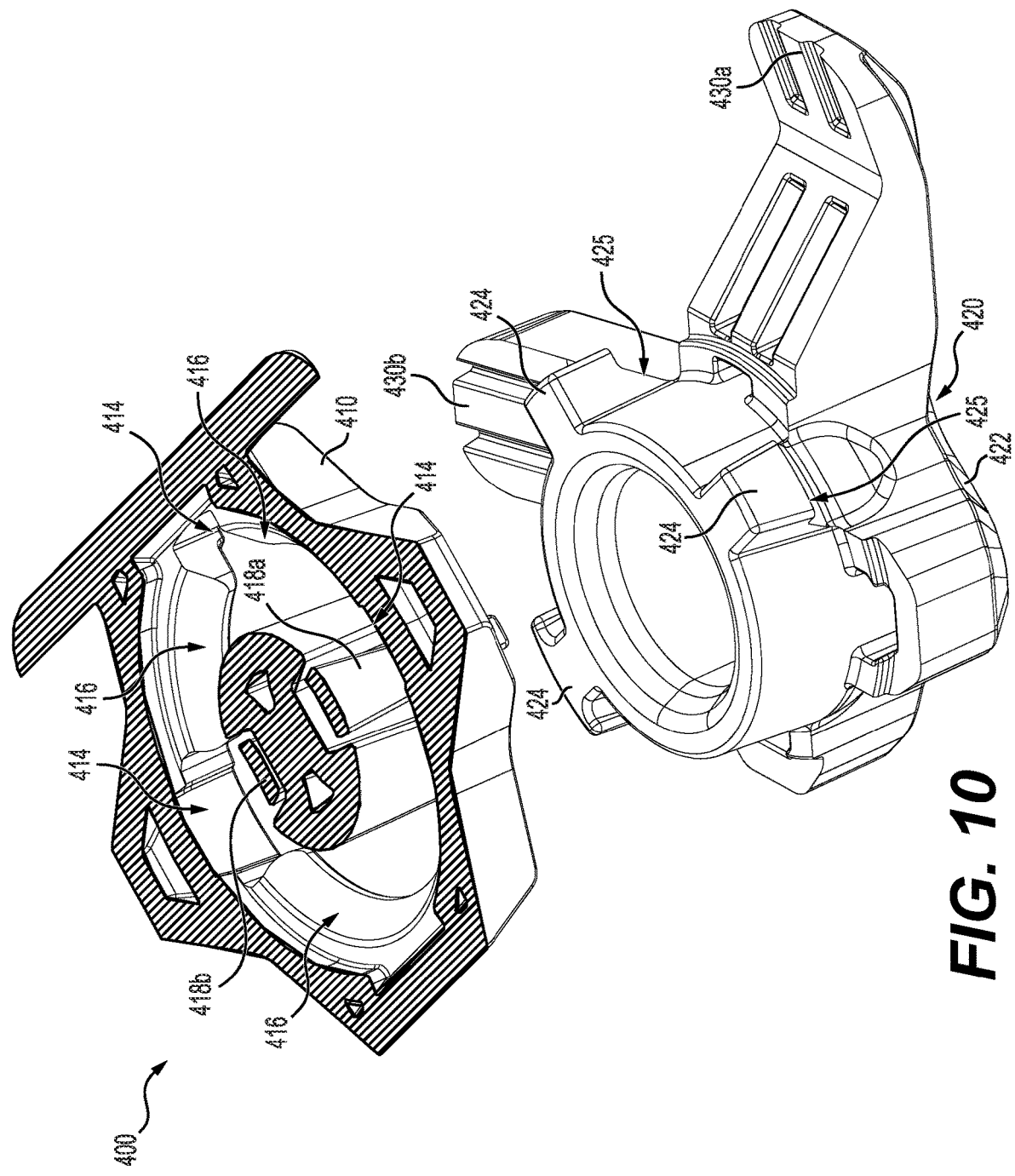
FIG. 10 is an exploded, perspective view taken from a top, rear, right side of the tongue assembly of FIG. 8, with a base shown in cross-sectional view taken along cross-section line 10-10 of FIG. 8.
Figure 11:
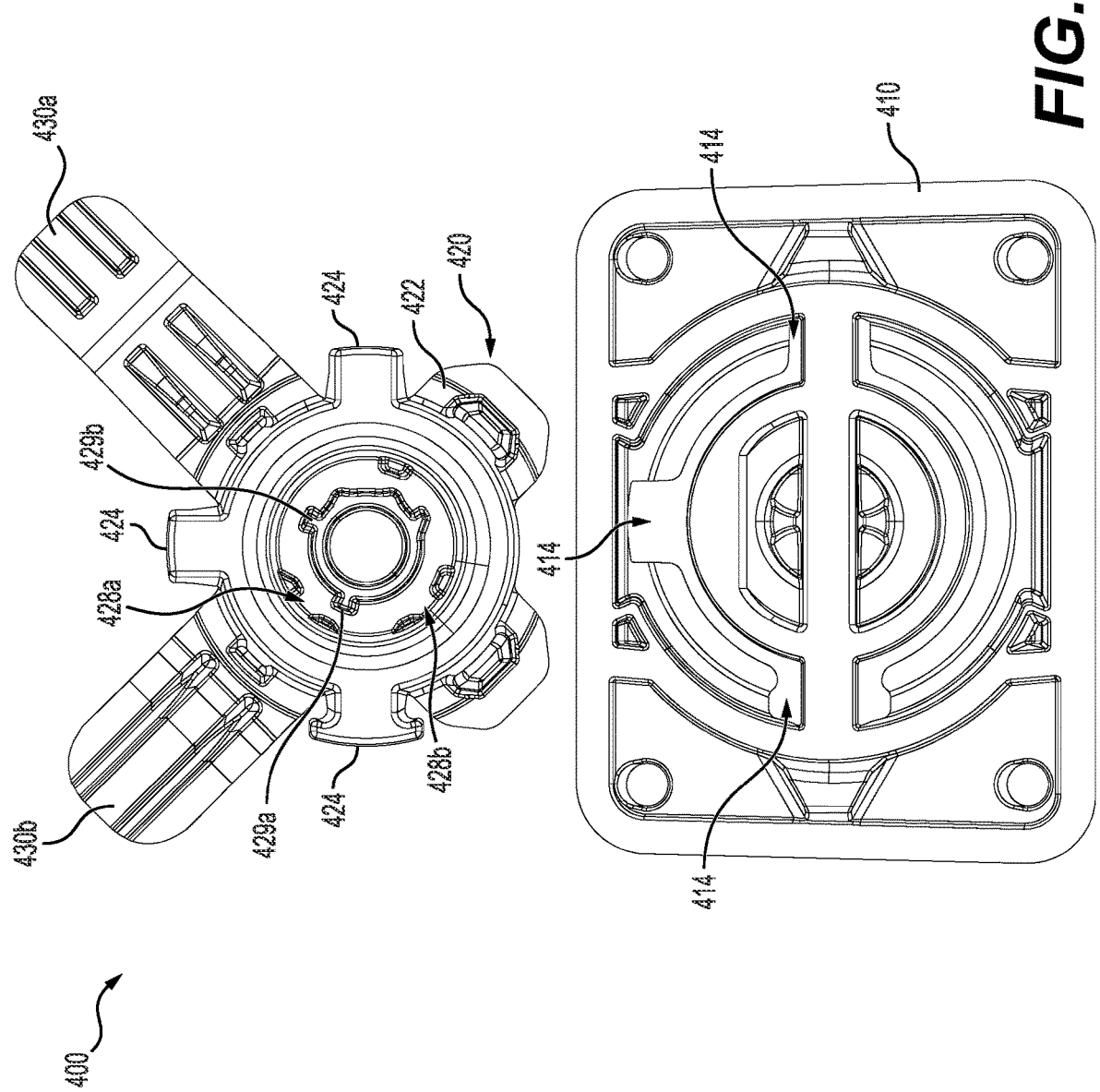
FIG. 11 is an exploded, top plan view of the tongue assembly of FIG. 8.

Referring to FIGS. 9 to 11, the connection between the base 410 and the grip 420 will be described. The grip 420 has three protrusions 424 sized and configured to be received in corresponding recesses 414 defined in the base. The protrusions 424 and the recesses 414 permits insertion (or removal) of the grip 420 into the base 410 only in a third position that differs from the frame engaging and anchor engaging positions. The third position is shown in FIG. 11. In the present implementation, one of the protrusions 424 adjacent to the tongue 430b has a T-shape, and this protrusion 434 is insertable into the correspondingly shaped recess 414 shown on the left of FIG. 11. Other shapes and configurations of the protrusions 424 and recesses 434 could be used in other implementations.

Figure 14A:
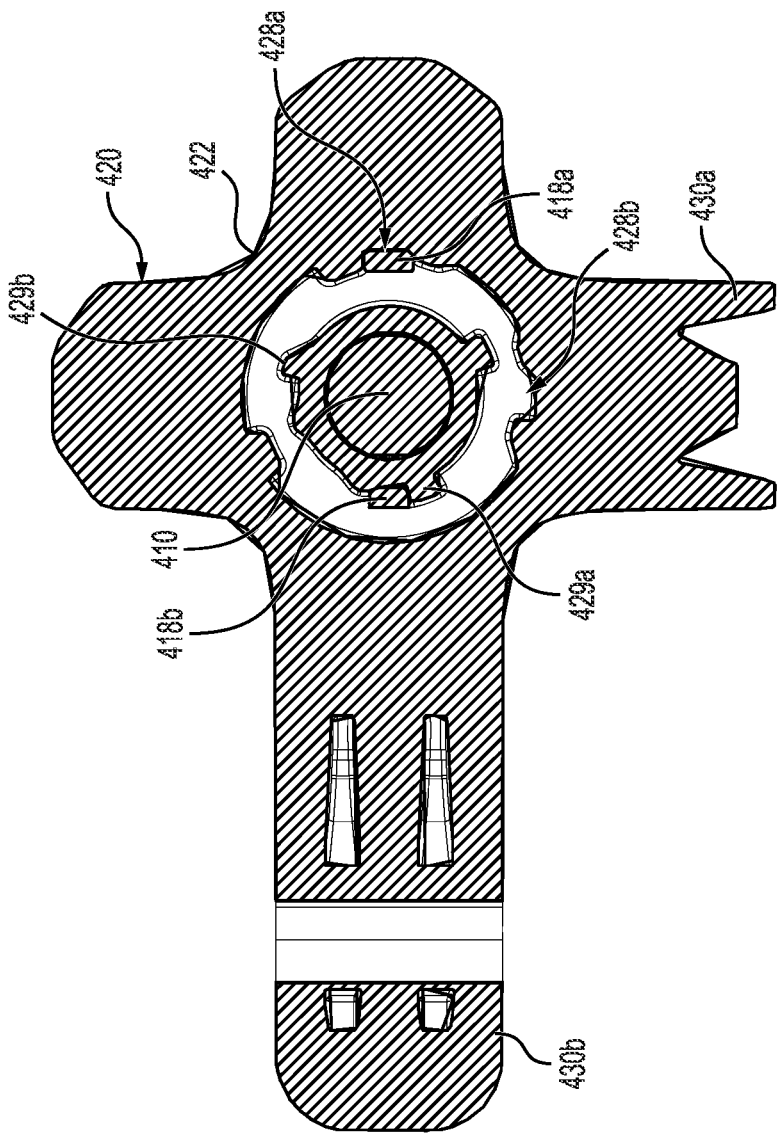
FIG. 14A is a cross-sectional view of the tongue assembly of FIG. 8 taken along cross-section line 14-14 of FIG. 8, with the grip moved in the frame engaging position.
Figure 14B:
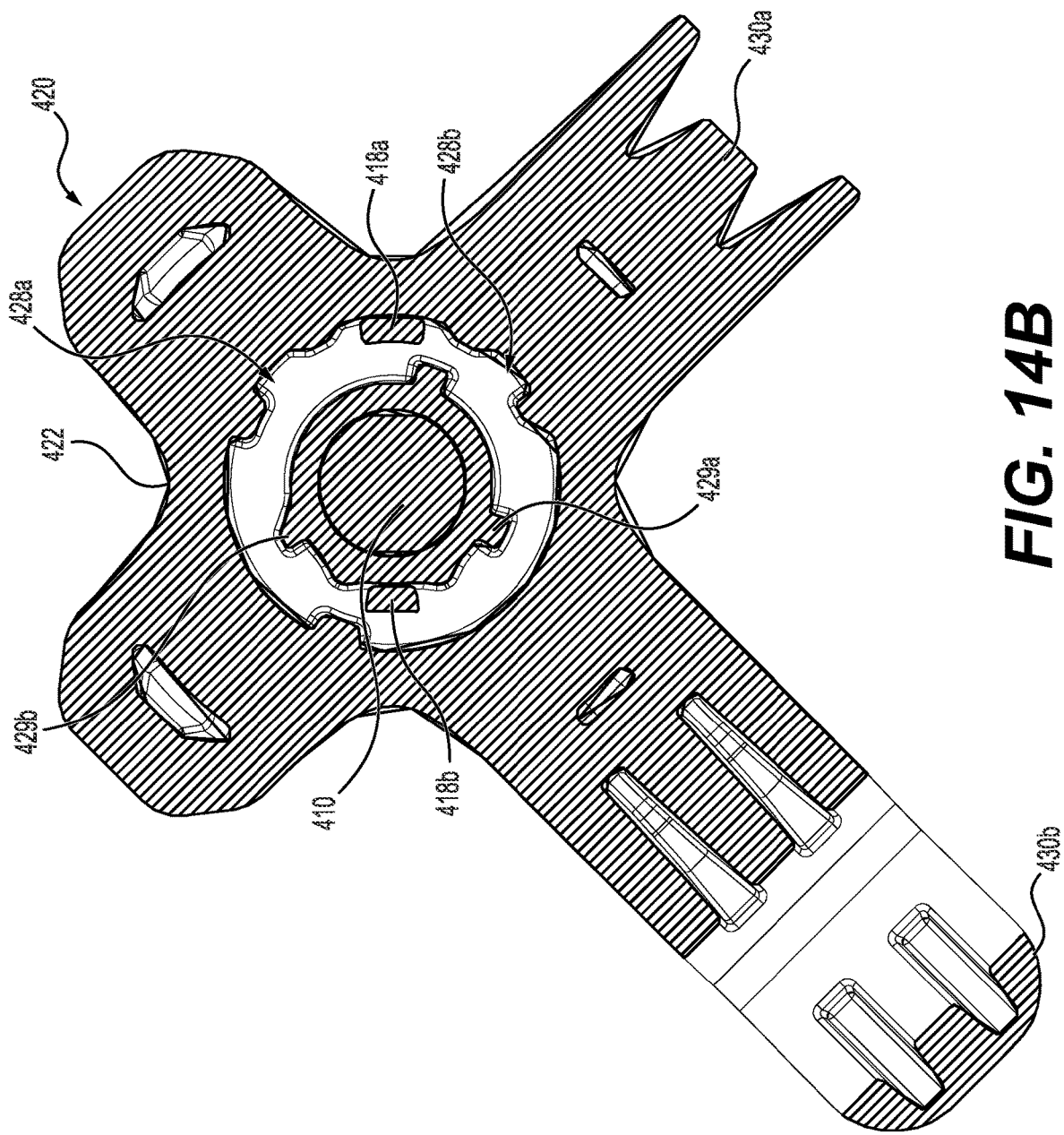
FIG. 14B is a cross-sectional view of the tongue assembly of FIG. 8 taken along cross-section line 14-14 of FIG. 8, with the grip moved between the frame engaging and anchor engaging positions.

When the grip 420 is inserted in the base 410, the grip 420 is pivotable relative to the base 410 as the protrusions 424 have engagement portions 425 (FIG. 9) that slide on arcuate tracks 416 defined in the base 410 (FIG. 10). The grip 420 is selectively pivotable relative to the base 410 about a pivot axis 426 (FIGS. 9, 17 and 21). The pivot axis 426 is skewed relative to the bottom wall 122 by an angle 428 (FIG. 16) defined parallel to the center plane 116. As seen in FIGS. 12 to 14C, the grip 420 pivots about 90 degrees between the frame engaging position (FIGS. 12 and 14A) and the anchor engaging position (FIGS. 13 and 14C).

Still referring to FIGS. 9 and 14A to 14C, the base 410 has first and second arms 418a, 418b projecting from the base 410. The grip 420 defines a first recess 428a adapted for receiving the first arm 418a when the grip 420 is pivoted in the frame engaging position (FIGS. 12 and 14A). When the first arm 418a is received in the recess 428a, the second arm 418b abuts against a first projection 429a of the grip 420, and the grip 420 is selectively retained in the frame engaging position. The grip 420 also defines a second recess 428b adapted for receiving the first arm 418a when the grip 420 is pivoted in the anchor engaging position (FIGS. 13 and 14C). When the first arm 418a is received in the recess 428b, the second arm 418b abuts against a second projection 429b, and the grip 420 is selectively retained in the anchor engaging position. When the first arm 418a is received in the corresponding recesses 428a, 428b, and when the second arm 418b abuts the corresponding projections 429a, 429b, the arms 418a, 418b prevent the grip 420 from pivoting inadvertently between the frame engaging and anchor engaging positions. However, the arms 418a, 418b are resilient members, and enable a user to select the position of the grip 420 when pivoted by hand. Thus, the grip 420 can be configured in the frame engaging and anchor engaging positions upon manual pivoting thereof, and without any tools.

The tongue assembly 400 further includes tongues 430a, 430b connected to the grip 420. As best seen in FIG. 11, the tongue 430a is longer than the tongue 430b, but this could differ in other implementations. The tongues 430a, 430b are movable with the grip 420 between the frame engaging and anchor engaging positions, as seen in FIGS. 12 and 13. In the present implementation, the grip 420 and the tongues 430a, 430b are integrally formed, but could be provided as separate, interconnected components in other implementations. As will become apparent from the description below, each tongue 430a, 430b is adapted to retain the storage box assembly 100 to the ATV 10.

Referring to FIGS. 5, 12 and 16, when the grip 420 is in the frame engaging position, the tongue 430a is in an operative position, i.e. a position that limits movement of the box 110 relative to the ATV 10, as will become apparent from the description below. A spacing 432a is defined between the tongue 430a and the bottom wall 122 of the storage box 110 for receiving a retaining member 440a having a thickness 442a between the tongue 430a and the bottom wall 122. The retaining member 440a is one of the frame members 20c of the frame 20 of the ATV 10. Referring to FIGS. 16 to 18, the frame member 20c extending in front of the lower portion 140 of the box 110 has the thickness 442a, and the tongue 430a is structured to retain the storage box 110 to the frame member 20c when the grip 420 is in the frame engaging position.

With reference to FIGS. 15 to 18, an illustrative scenario describing the installation and use of the storage box assembly 100 with the ATV 10 is provided below. Initially, the front storage box assembly 100 is separate from the ATV 10. When a user desires to install the storage box assembly 100 on the ATV 10, the user first opens or removes the lid 300 and operates the levers of the left and right anchors 170 so as to configure them in the unlocked position (shown in FIG. 6B), if this is not already the case. The user also moves the grip 420 to the frame engaging position as shown in FIGS. 5 and 12, if this is not already the case.

The user then disposes the storage box assembly 100 above the front receptacle 96a provided on the ATV 10, as shown in FIG. 15, tilts the storage box assembly 100 forward as shown in FIG. 16, and engages the tongue 430a to the frame member 20c defining the portion 20a of the frame 20 such that the frame member 20c extends in the spacing 432a. The user then lowers the storage box 110 and inserts the lower portion 140 of the box 110 in the front receptacle 96a until (i) the left and right latches 174 and their respective pairs of cams 178 are received in the corresponding left and right apertures 200, and (ii) the bottom wall 122 abuts the top surface 96b of the front receptacle 96a. The box 110 is then supported on the ATV 10 by the top surface 96b of the front receptacle 96a and by the portion 20a of the frame 20. The box 110 is secured to the ATV 10 when the left and right anchors 170 are moved in the locked position (as shown in FIG. 18), and the box 110 is further retained to the ATV 10 via the tongue 430a of the tongue assembly 400 as the frame member 20c is received between the tongue 430a and the bottom wall 122 (FIG. 18).

The front storage box assembly 100 is therefore selectively secured to the ATV 10 and the user can use the front storage box assembly 100 to carry accessories and cargo while the ATV 10 is being operated. The user can open and close the lid 300 using the stretchable rubber straps 304. When the user desires to remove the front storage box assembly 100 from the ATV 10, the user opens or remove the lid 300, rotates the levers by about 90 degrees to move the left and right latches 174 from the locked position (FIG. 7B) to the unlocked position (FIG. 6B), and withdraws the box 110 from the receptacle 96a by tilting the box 110 forward, and by pulling the front storage box assembly 100 upwardly for disengaging the tongue 430a from the frame member 20c.

Figure 20:
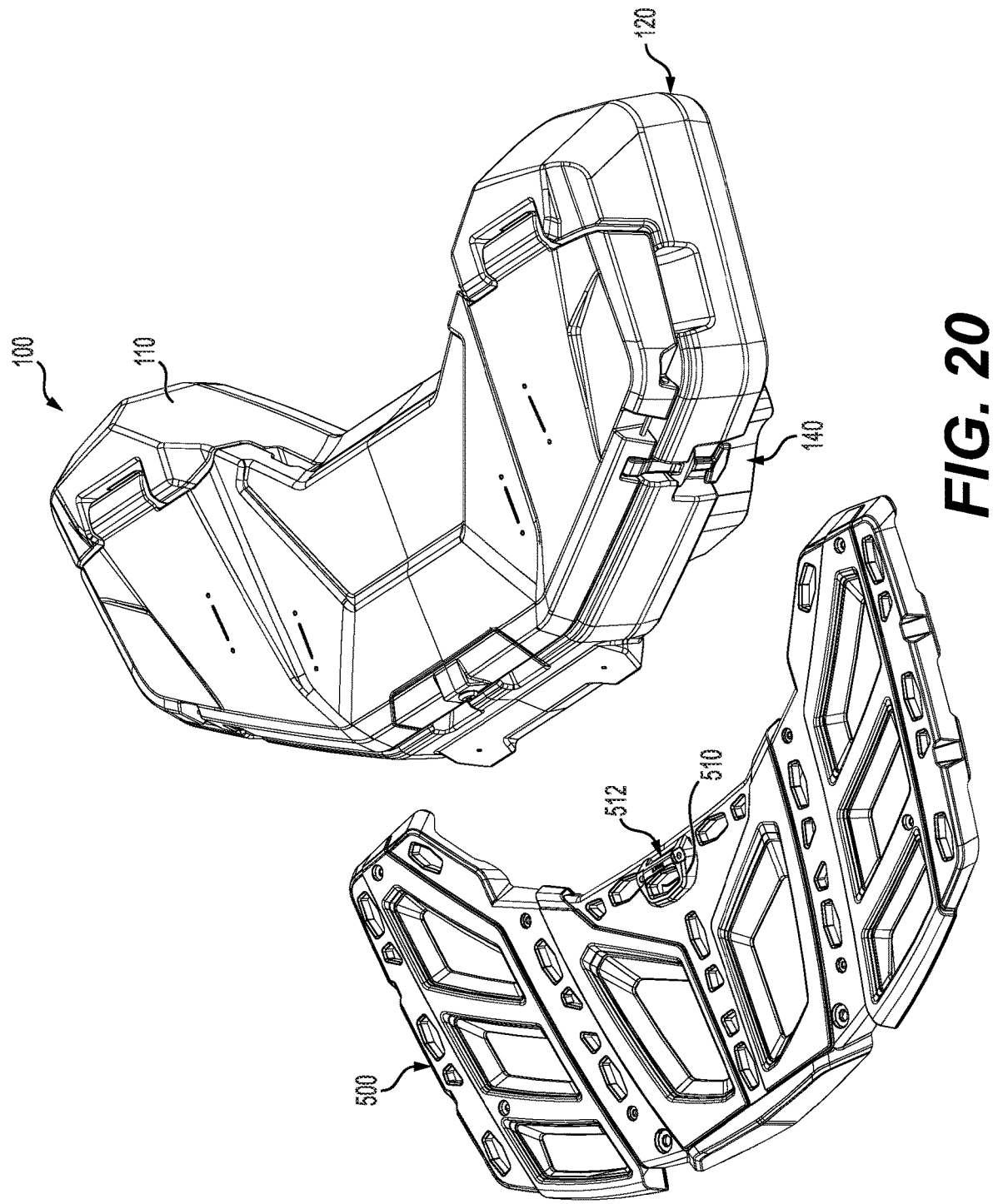
FIG. 20 is a perspective view taken from a front, top, left side of the storage box assembly of FIG. 19 and a rack adapted for connection to the vehicle of FIG. 1, with the rack including an anchor fixture.

Referring to FIGS. 19 to 21, there is shown the storage box assembly 400 with a rack 500 that is adapted for connection to the frame 20 of the ATV 10. In some implementations, the rack 500 is as a rack that is adapted to be connected to a cargo bed or platform of a vehicle being different from the ATV 10, for example a side-by-side vehicle (SSV). It is contemplated that the storage box assembly 400 could be secured elsewhere on these vehicles. An anchor fixture 510 is connected to the rack 500, and defines a rear facing aperture 512. In the present implementation, the anchor fixture 510 is similar to the anchor fixture described in U.S. Pat. No. 9,751,592 B2, the entirety of which is incorporated by reference herein. The anchor fixture 510 could be configured otherwise in other implementations of the present technology. The anchor fixture 510 could also be installed at different locations on the ATV 10, or on a SSV. For example, the anchor fixture 510 could be installed on the cargo bed or platform of the vehicle, or the roof.

When the grip 420 is pivoted in the anchor engaging position (FIGS. 13 and 19), the tongue 430*b* is in an operative position, i.e. again, a position that limits movement of the box 110 relative to the ATV 10. A spacing 432*b* is defined between the tongue 430*b* and the bottom wall 122 of the storage box 110 for receiving the anchor fixture 510, which acts as a second retaining member 440*b* in this implementation. The anchor fixture 510 has a thickness 442*b* between the tongue 430*b* and the bottom wall 122. Referring to FIGS. 16 and 21, it can be appreciated that the spacing 432*b* is smaller than the spacing 432*a*, and that the thickness 442*b* is smaller than the thickness 442*a*.

Another illustrative scenario describing the installation and use of the storage box assembly 100 with the ATV 10 including the rack 500 is provided below. Initially, the front storage box assembly 100 is separate from the ATV 10. When a user desires to install the storage box assembly 100 on the rack 500 of the ATV 10, the user first opens or removes the lid 300 and operates the levers of the left and right anchors 170 so as to configure them in the unlocked position (shown in FIG. 6B), if this is not already the case. The user also moves the grip 420 to the anchor engaging position as shown in FIG. 13, if this is not already the case.

The user then disposes the storage box assembly 100 above the front receptacle 96*a* provided on the ATV 10, and inserts the tongue 430*b* in the aperture 512 of the anchor fixture 510. The user then lowers the storage box 110 until (i) the left and right latches 174 and their respective pairs of cams 178 are received in the corresponding left and right apertures 200, and (ii) the bottom wall 122 abuts the anchor fixture 510. The box 110 is secured to the ATV 10 when the left and right anchors 170 are moved in the locked position (as shown in FIG. 18), and the box 110 is further retained to the ATV 10 via the tongue 430*b* of the tongue assembly 400 as the anchor fixture 510 is received between the tongue 430*b* and the bottom wall 122 (FIG. 21).

The front storage box assembly 100 is therefore selectively secured to the ATV 10 and the user can use the front storage box assembly 100 to carry accessories and cargo while the ATV 10 is being operated. The user can open and close the lid 300 using the stretchable rubber straps 304. When the user desires to remove the front storage box assembly 100 from the ATV 10, the user opens or remove the lid 300, rotates the levers by about 90 degrees to move the left and right latches 174 from the locked position (FIG. 7B) to the unlocked position (FIG. 6B), and pulls the box 110 upwardly while withdrawing the tongue 430*b* from the aperture 512 of the anchor fixture 510.

It is to be noted that the anchors 170 shown in the present implementation are only one example of anchors suitable for securing the storage box assembly 100 to the ATV 10. Other types of anchors could be used in other implementations.

Furthermore, it is to be appreciated that the present technology enables the storage box assembly 100 to be secured at different locations of a same vehicle since the grip 420 of the tongue assembly 400 can be moved between the frame engaging position and the anchor engaging position, and thus be configured for securing the storage box assembly 100 to different structures, or types of mounting points of the vehicle. The frame member 20*c* and the anchor fixture 510 described in the present description are only examples of structures or types of mounting points to which the storage box assembly 100 can be secured via the tongue assembly 400. Moreover, it is contemplated that the storage box assembly 100 could also be secured to different vehicles having different structures (or types of mounting points) suitable to receive and support the storage box assembly 100.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A storage box assembly for a vehicle, comprising:
   a storage box including a wall; and
   a tongue assembly connected to the wall, the tongue assembly including:
   a grip selectively movable between a first position and a second position;
   first and second tongues connected to the grip and movable with the grip between the first and second positions;
   in response to the grip being in the first position, the first tongue is in an operative position, and a first spacing is defined between the first tongue and the wall of the storage box for receiving a first retaining member having a first thickness between the first tongue and the wall; and
   in response to the grip being in the second position, the second tongue is in an operative position, and a second spacing is defined between the second tongue and the wall of the storage box for receiving a second retaining member having a second thickness between the second tongue and the wall,
   the second spacing being smaller than the first spacing, and the second thickness being smaller than the first thickness.

2. The storage box assembly of claim 1, further comprising a base connected to the wall, and the grip is movably connected to the base.

3. The storage box assembly of claim 2, wherein the grip is selectively pivotable relative to the base.

4. The storage box assembly of claim 3, wherein the grip pivots 90 degrees between the first and second positions.

5. The storage box assembly of claim 3, wherein the grip pivots about a pivot axis, and the pivot axis is skewed relative to the wall.

6. The storage box assembly of claim 2, wherein the base comprises at least one arm projecting from the base, and the grip defines a first recess adapted for receiving the at least one arm when the grip is pivoted in the first position, and a second recess adapted for receiving the at least one arm when the grip is pivoted in the second position, the at least one arm selectively retaining the grip in one of the first position and the second position.

7. The storage box assembly of claim 1, wherein the grip, the first tongue and the second tongue are integrally formed.

8. The storage box assembly of claim 1, further comprising at least one anchor mounted to the storage box for selectively securing the storage box assembly to the vehicle in collaboration with the tongue assembly.

9. The storage box assembly of claim 1, wherein the first retaining member is a frame member of the vehicle, and the first tongue is adapted to engage the frame member of the vehicle.

10. The storage box assembly of claim 1, wherein the second retaining member is an anchor fixture, and the second tongue is adapted for insertion into the anchor fixture.

11. The storage box assembly of claim 1, wherein the grip is a knob.

12. The storage box assembly of claim 1, wherein the first tongue is longer than the second tongue.

* * * * *